(12) United States Patent
Marco et al.

(10) Patent No.: US 11,822,773 B2
(45) Date of Patent: Nov. 21, 2023

(54) SYSTEMS AND METHODS FOR GENERATING AND UTILIZING AN INTERACTIVE CAUSAL LOOP DIAGRAM USING A CAUSAL LOOP DESIGNER

(71) Applicant: PwC Product Sales LLC, New York, NY (US)

(72) Inventors: Timothy Marco, La Grange, IL (US); Joseph David Voyles, Louisville, KY (US); Lyle Wallis, Fort Collins, CO (US); Mark Paich, Littleton, CO (US); Sindy Ma, Ann Arbor, MI (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 17/702,319

(22) Filed: Mar. 23, 2022

(65) Prior Publication Data
US 2023/0305679 A1    Sep. 28, 2023

(51) Int. Cl.
*G06F 3/0482* (2013.01)
*G06F 3/0484* (2022.01)

(52) U.S. Cl.
CPC .......... *G06F 3/0484* (2013.01); *G06F 3/0482* (2013.01)

(58) Field of Classification Search
CPC ................................................. G06F 3/048–05
See application file for complete search history.

(56) References Cited

U.S. PATENT DOCUMENTS

| | | | | |
|---|---|---|---|---|
| 5,428,740 A * | 6/1995 | Wood | ...................... | G06F 30/20 703/22 |
| 7,188,332 B2 * | 3/2007 | Charisius | .................. | G06F 8/71 717/104 |
| 9,983,575 B2 * | 5/2018 | Nixon | ................. | G05B 23/0267 |
| 10,530,894 B2 * | 1/2020 | King | ..................... | G06F 16/258 |
| 10,860,298 B2 * | 12/2020 | Pietzsch | .................... | G06F 8/34 |

(Continued)

OTHER PUBLICATIONS

Vensim, "Vensim Causal Loop Diagramming", published Jul. 17, 2020, available at «https://www.youtube.com/watch?v=G58ESIKTctY», 26 pages (Year: 2020).*

(Continued)

*Primary Examiner* — Daniel Rodriguez
(74) *Attorney, Agent, or Firm* — Morrison & Foerster LLP

(57) ABSTRACT

Systems and methods for generating and utilizing an interactive causal loop diagram using a causal loop designer are provided. In one or more examples, a computer-implemented method for creating a causal loop diagram comprising visually emphasized elements can comprise displaying a first element and a second element, wherein the first element and the second element comprise visually emphasizable elements. In response to receiving a user command to connect the first element to the second element, the method can comprise displaying a connection between the first element and the second element, wherein the connection comprises a visually emphasizable element. In one or more examples, the method comprises displaying a causal loop diagram comprising the first element, the second element, and the connection. In response to a user activating a visual emphasis tool, the method can comprise visually emphasizing one or more of the visually emphasizable elements.

33 Claims, 17 Drawing Sheets

(56) References Cited

U.S. PATENT DOCUMENTS

| | | | |
|---|---|---|---|
| 11,514,361 B2* | 11/2022 | Salonidis | G06F 3/04847 |
| 11,574,706 B2* | 2/2023 | Mellen | C12Q 1/68 |
| 2004/0204081 A1* | 10/2004 | Kim | H04M 1/6058 |
| | | | 455/569.1 |
| 2021/0065048 A1* | 3/2021 | Salonidis | G06F 9/542 |

OTHER PUBLICATIONS data.gov.scot, "Child Poverty System Map", available on Jul. 27, 2021, available at «https://data.gov.scot/child-poverty-system-map/index.html» and «https://data.gov.scot/child-poverty-system-map/interactive-system-map.html», 9 pages (Year: 2021).*

International Search Report and Written Opinion dated May 22, 2023, directed to International Application No. PCT/US2023/064874; 8 pages.

* cited by examiner

SYSTEMS AND METHODS FOR GENERATING AND UTILIZING AN INTERACTIVE CAUSAL LOOP DIAGRAM USING A CAUSAL LOOP DESIGNER

FIELD OF THE DISCLOSURE

This disclosure relates to systems and methods for generating and utilizing an interactive causal loop diagram using a computer-based causal loop designer.

BACKGROUND OF THE DISCLOSURE

A causal loop diagram is a systems model useful for modeling and analyzing systems that include a variety of elements. Causal loop diagrams provide a visual representation of a systems model that illustrates both the elements that make up the system, and the connections between those elements. The elements that make up a system are often called variables, with the connections between variables referred to as causal relationships. A causal loop diagram also includes feedback loops, which are a collection of variables and relationships that create chains of causality that connect back to themselves. For example, a causal loop diagram may contain variable A which is related to variable B which is in turn related to variable C which is related to variable A. In such arrangement, there exists a feedback loop including variables A, B, and C.

Causal loop diagrams are useful in multiple ways. First, the model creation process of identifying each variable and the relationships between them can be an informative exercise to define the constituent elements of a system. The model creation process can also be a collaborative exercise enabling multiple people to design and develop models together. After the model is created, identifying the feedback loops can enable predictions and analyses regarding changes to variables within those loops. Furthermore, causal loop diagrams can be useful as a communicative tool, to present and explain the dynamics of a particular system to others.

SUMMARY OF THE DISCLOSURE

As stated above, a causal loop diagram is a systems model that can be useful for analyzing the causal relationships between elements within a system. As more elements are added to a diagram and more relationships between those elements are defined, the causal loop diagram becomes more useful from an analytical point, as the system dynamics can be more fully studied. As the complexity of a causal loop diagram increases, however, the causal loop diagram can become confusing and overwhelming. Accordingly, the use of a causal loop diagram is limited, in that the diagram will become less useful as it becomes more complex because that complexity can render the diagram too complicated to decipher.

When using a causal loop diagram to model behavior of a particular system, the diagram can quickly become vastly complex. For example, practical business problems can involve complex structures involving dozens, or even hundreds, of individual elements. Although a causal loop diagram can be useful to understand of each of those elements, the relationships between elements, and the more system-view impact of those relationships illustrated in the various loops they may affect, the diagram itself can quickly become overly complicated and difficult to decipher. Moreover, although the analytical value of a causal loop diagram increases as more variables and relationships are added into the diagram, the readability of the diagram decreases as the diagram becomes more complex.

For example, a causal loop diagram regarding a ride sharing business model can be modeled using the variables of passenger demand, number of drivers, and the waiting time to match a driver and a rider. In this example, these variables can form a feedback loop with passenger demand related to the number of drivers which is related to the waiting time which is in turn related back to passenger demand. This feedback loop can be used to analyze how changes in each of those individual variables impact the system as a whole. However, this is a simplified view of the system. This model could be improved by including other variables such as the cost of car insurance, the availability and cost of public transit, the cost of each ride to passengers on the ride sharing platform, car-pooling or shared ride options, surge pricing during high demand periods, geographic saturation, average length of a ride in a geographic area, etc. Each of these additional variables will have some connection to the three initial variables and can be included in the system to more holistically analyze the system. However, by introducing more variables, relationships, and loops, the complexity will in turn increase which can make digesting the information more difficult and time consuming, as well as decrease the ability to explain the system-wide impacts of particular variables within the system to others.

When assessing or presenting a complex diagram, it can be helpful to view individual groups of variables or loops within the diagram in isolation. Viewing individual groups of variables or loops in isolation can improve the readability of a diagram because it enables the user to view the impactful aspects of the diagram sequentially. For example, when viewing a complex diagram with a large number of variables and loops, the diagram may seem overwhelming to digest and the user may opt to view each loop of the diagram in isolation before attempting to comprehend the overall system dynamics of the model.

Furthermore, in a business context, which is an inherently iterative and collaborative environment, a platform to create a causal loop diagram should not only enable the creation of diagrams that are communicable to others, but also easy to edit. Enabling the creation of easily editable diagrams not only facilitates collaboration but also enables users to assess how changing or replacing variables or relationships may impact the system over a period of time in the future. That is, users can alter variables and/or relationships and use the resultant effects of those changes to make predictions regarding the future behavior of the system.

Finally, a platform to create a causal loop diagram is ideally interactive. Interactivity can be realized with exploratory tools such as tools enabling users to view elements and/or aspects of a diagram in a variety of manners. For example, tools that enable users to group elements of a diagram in a logical manner and then view those grouped elements in isolation or in an emphasized manner can increase the interactivity of a given platform. An interactive platform is ideal because it enables an immersive experience for both internal and external communication of the platform. Thus, a platform to design an effective causal loop diagram should enable such functionalities.

Current platforms to create causal loop diagrams include platforms that enable the creation of static printable diagrams. Such platforms lack exploratory tools that foster interactivity. Other existing platforms to create causal loop diagrams include web-based platforms that enable creation of relatively simple diagrams. These existing web-based platforms lack the ability to change the viewpoint of the diagram, meaning that a user attempting to analyze the diagram may be able to zoom in or out, but cannot view individual loops or groups in isolation and therefore cannot easily interpret complex diagrams. Moreover, because these platforms can only create relatively simple diagrams, they are generally restricted to creating educational diagrams, rather than complex professional diagrams. Current web-based platforms thus lack the ability to create complex professional diagrams, or the ability to create those complex professional diagrams without sacrificing readability.

Accordingly, systems and methods for generating and utilizing an interactive causal loop diagram using a computer-based causal loop designer are presented herein. In one or more examples, a method can enable a user to create a causal loop diagram with visually emphasizable element icons using an interactive causal loop designer. The interactive causal loop designer can include an editor mode that enables the user to add one or more elements to an editor graphical user interface (GUI). In one or more examples, the elements can be displayed on the editor GUI as icons that can be visually emphasized. In one or more examples, the method can include visually emphasizing the icons.

In some examples, a computer-implemented method for creating a causal loop diagram comprising visually emphasized elements comprises: displaying a user interface comprising one or more selectable spawn buttons; in response to a user selecting one or more of the selectable spawn buttons, displaying a first element and a second element on the user interface, wherein the first element and the second element comprise visually emphasizable elements; in response to receiving a user command to connect the first element to the second element, displaying a connection between the first element and the second element, wherein the connection comprises a visually emphasizable element; displaying a causal loop diagram comprising the first element, the second element, and the connection; and in response to a user activating a visual emphasis tool, visually emphasizing one or more of the visually emphasizable elements.

In some examples, the one or more selectable spawn buttons comprise a variable spawn button, a group spawn button, and a loop spawn button, and the method comprises: displaying a variable element if the user selects the variable spawn button, displaying a loop element if the user selects the loop spawn button, or displaying a group element if the user selects the group spawn button; and wherein each of the variable element, the loop element, and the group element comprise visually emphasizable elements.

In some examples, the first element is a first variable element, the second element is a second variable element and the connection is a relationship, and wherein the first variable element, the second variable element and the relationship comprise visually emphasizable elements.

In some examples, the computer-implemented method further comprises: in response to the user selecting a loop spawn button, displaying a loop element on the user interface; in response to receiving a user command to associate the first variable element and the second variable element with the loop element, creating an association between the first variable element, the second variable element, and the loop element; displaying a causal loop diagram comprising the first element, the second element, the connection, and the loop element; and in response to a user activating a visual emphasis tool with respect to the loop element, visually emphasizing each element of the association.

In some examples, the computer-implemented method further comprises: in response to the user selecting a group spawn button, displaying a group element on the user interface; in response to receiving a user command to associate the first variable element and the second variable element with the group element, creating an association between the first variable element, the second variable element, and the group element; and displaying a causal loop diagram comprising the first element, the second element, the connection, and the group element; and in response to a user activating a visual emphasis tool with respect to the loop element, visually emphasizing each element of the association.

In some examples, the computer-implemented method further comprises: in response to a user selecting the first element, displaying an attribute menu about the first element; in response to receiving one or more user commands to add one or more attributes about the first element, associating the one or more attributes with the first element; and displaying a causal loop diagram comprising the first element, the second element, the connection, and the one or more attribute elements.

In some examples, the visual emphasis tool is a highlight tool.

In some examples, activating the highlight tool for a given visually emphasizable element occurs in response to a user placing a cursor over a particular visually emphasizable element.

In some examples, the displayed causal loop diagram comprises one or more emphasizable elements, and the method comprises: in response to a user placing a cursor over a particular visually emphasizable element of the causal loop diagram displayed on the user interface, highlighting the particular visually emphasizable element.

In some examples, the method comprises highlighting the particular visually emphasizable element and one or more other visually emphasizable elements that are connected to the particular visually emphasizable element.

In some examples, the user interface comprises a legend comprising one or more element types corresponding to a type of element that can be displayed on the user interface, and the one or more element types comprise visually emphasizable elements; and the method comprises: in response to a user placing the cursor over one of the one element types of the one or more element types in the legend, highlighting each element displayed on the user interface that is the same type of element as the element type.

In some examples, the method comprises: in response to the user selecting to enter a detail view of a particular element, displaying a transition animation before displaying a detail view user interface comprising the particular element and one or more relevant elements, the one or more relevant elements comprising one or more elements that are connected to the particular element and one or more connections that are connected to the particular element.

In some examples, a system for enabling a first user to create a causal loop diagram with one or more elements using an interactive causal loop designer comprises: a memory; one or more processors; and one or more programs, wherein the one or more programs are stored in the memory and configured to be executed by the one or more processors, the one or more programs when executed by the one or more processors cause the processor to: display a user interface comprising one or more selectable spawn buttons; in response to a user selecting one or more of the selectable spawn buttons, display a first element and a second element on the user interface, wherein the first element and the second element comprise visually emphasizable elements; in response to receiving a user command to connect the first element to the second element, display a connection between the first element and the second element, wherein the connection comprises a visually emphasizable element; display a causal loop diagram comprising the first element, the second element, and the connection; and in response to a user activating a visual emphasis tool, visually emphasize one or more of the visually emphasizable elements.

In some examples, a computer-readable storage medium stores one or more programs for an interactive causal loop designer, the one or more programs comprising instructions which, when executed by an electronic device with a display and a user input interface, cause the device to: display a user interface comprising one or more selectable spawn buttons; in response to a user selecting one or more of the selectable spawn buttons, display a first element and a second element on the user interface, wherein the first element and the second element comprise visually emphasizable elements; in response to receiving a user command to connect the first element to the second element, display a connection between the first element and the second element, wherein the connection comprises a visually emphasizable element; display a causal loop diagram comprising the first element, the second element, and the connection; and in response to a user activating a visual emphasis tool, visually emphasize one or more of the visually emphasizable elements.

It will be appreciated that any of the variations, aspects, features and options described in view of the systems can be combined.

Additional advantages will be readily apparent to those skilled in the art from the following detailed description. The aspects and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

The invention will now be described, by way of example only, with reference to the accompanying drawings, in which.

DETAILED DESCRIPTION OF THE DISCLOSURE

Figure 1:
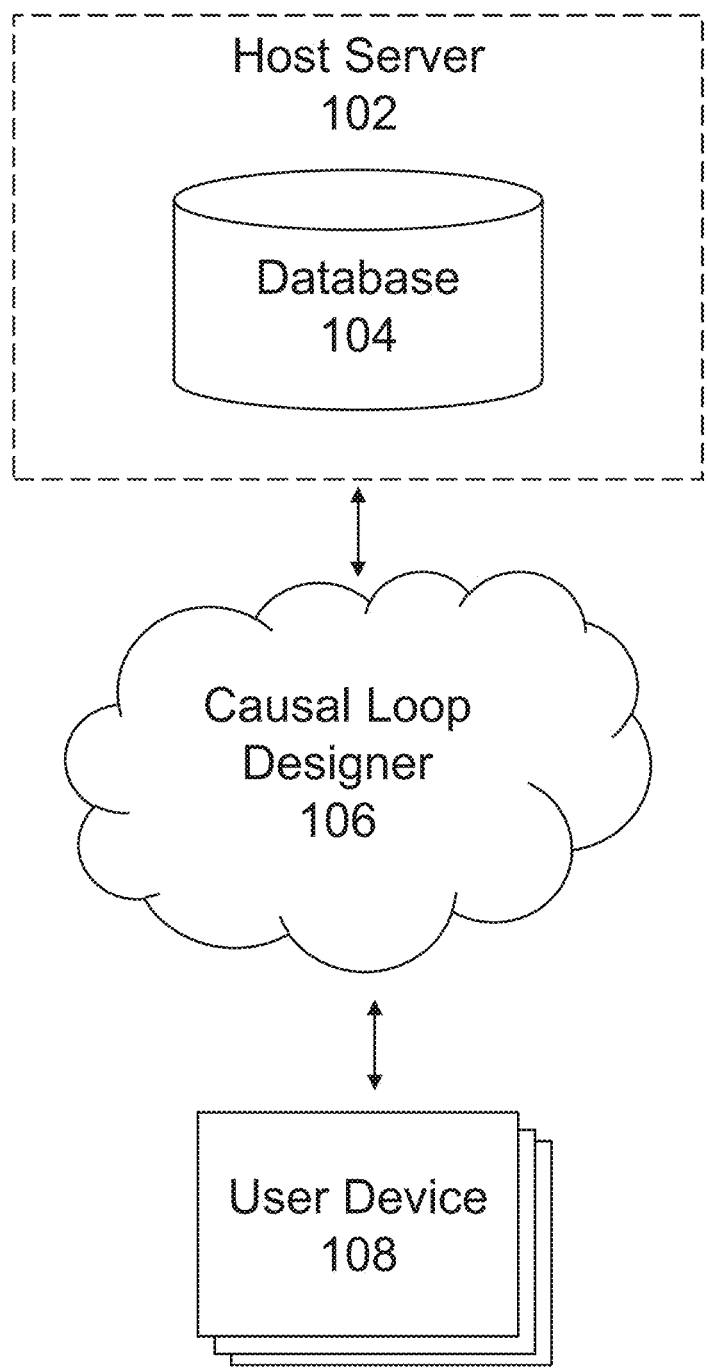
FIG. 1 depicts an exemplary computer-based system for implementing a causal loop designer (CLD), in accordance with one or more examples.

In the following description of the disclosure and examples, reference is made to the accompanying drawings in which are shown, by way of illustration, specific examples that can be practiced. It is to be understood that other examples can be practiced, and changes can be made, without departing from the scope of the disclosure.

In addition, it is also to be understood that the singular forms "a," "an," and "the," used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portion of the detailed description that follows are presented in terms of algorithms and symbolic representations of operations executed on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these similar terms are to be associated with the appropriate physical quantities and are merely convenient labels applied to these quantities. Unless specifically otherwise apparent from the following discussion, it is to be appreciated that throughout the description, discussions utilizing terms such as "processing," "computing," "calculating," "determining," "displaying," or the like, refer to the action and processes of a computer system or similar electronic computing device that manipulates and transforms data represented as physical (electronic) quantities within the computer system memories or registers, or other information storage, transmission, or display devices.

Certain aspects of the present disclosure include process steps and instructions described in the form of an algorithm. It should be noted that the process steps and instructions of the present disclosure could be embodied in software, firmware, or hardware, and, when embodied in software, they could be downloaded to reside on and be operated from different platforms used by a variety of operating systems.

The present disclosure also relates to a device for performing the operations herein. The device may be specially constructed for the required purposes or it may comprise a general-purpose computer selectively activated or reconfigured by a computer program stored in the computer. Such a computer program may be stored in a non-transitory, computer-readable storage medium such as, but not limited to, any type of disk including floppy disks, optical disks, CD-ROMs, magnetic-optical disks, read-only memories (ROMs), random access memories (RAMs), EPROMs, EEPROMs, magnetic of optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

FIG. 1 depicts an exemplary computer-based system 100 for implementing a causal loop designer, in accordance with one or more examples. In the examples described below, the term "causal loop diagram" is used to indicate a diagram that provides information regarding a system. The system can include one or more variables connected to other variables via a causal relationship, which may form and/or be assigned to one or more loops or groups.

The variables within a causal loop diagram can be representative of real-world elements that can be quantitatively or qualitatively measured. For example, a quantitative variable can include the amount an employee's salary increases, whereas a qualitative variable can include an employee's satisfaction with their job. A causal relationship can be direct, meaning that a change to a first variable will result in similar changes to a second connected variable. Alternatively, a relationship can be inverse, indicating that a change to a first variable will result in opposite changes to the second variable. The type of causal relationships between variables can be important in various manners. For example, causal relationships are important to understanding how changes in a system propagate throughout the system based on the various relationships and their types.

The type of a causal relationship between variables is also important with respect to the type of loop that includes those variables. A loop can be a reinforcing loop, which is composed of variables that are related to one another such that the values of the variables increase or decrease over time, or a balancing loop, which is composed of least two variables that are inversely related to one another such that the values of the variables oscillate and/or remain static over time. The type of a loop, and thus the type of causal relationships within that loop, impact how the variables/relationships/loop impact the overall system dynamics.

For example, a reinforcing feedback loop may include three variables each directly related to one another, in that an increase in one variable leads to a corresponding increase in another. Thus, as the first variable increases, the second and third variable also increase which then leads the first variable to further increase. Accordingly, a reinforcing loop can be useful to predict and/or assess system growth or decay. Alternatively, a balancing loop may include three variables interrelated as follows: the first variable is directly related to the second variable which is inversely related to the third variable which is in turn directly related to the first variable. In such system, because the second and third variable are inversely related to one another, the system will oscillate and balance as the values of the second and third values are changed. A balancing loop can thus be useful to analyze cyclical patterns and system stability over time. Accordingly, feedback loops are critically important to systems thinking because loops can generate unexpected, extreme, or otherwise important behavior in a system.

As shown in FIG. 1, the system 100 can include a host server 102 communicatively connected to a causal loop designer 106 which is in turn communicatively connected to one or more user devices 108. The host server 102 can include a database 104. Although only one host server 102 and one database 104 are shown in FIG. 1, it should be understood that system 100 can include any number of databases and may be hosted one more than one server. Similarly, the causal loop designer 106 may be communicatively connected to any number of user devices 108. The user device 108 can be any type of computing device, such as a mobile phone, tablet, personal computer, desktop computer, etc.

The host server 102 may be a virtual server in a virtual machine environment hosted by a third party, The virtual machine environment can include one or more processors and one or more memory devices in communication with the host server 102 which is then in communication with the causal loop designer 106. The host server 102 may be communicatively connected to the causal loop designer 106 over a network using data transfers or other wireless protocol. The user device 108 may be connected to the causal loop designer 106 over a similar network.

The causal loop designer 106 is, in one or more examples, an internet-based software system. The causal loop designer 106 can include one or more graphical user interfaces that enable users to create, modify, store, access, interact with, and/or export causal loop diagrams using a user device 108. The causal loop designer 106 can be hosted by the host server 102. The database 104 can be used to store, in non-limiting examples, data concerning users of the causal loop designer 106, outputs of diagrams created by one or more users, diagrams actively being created by one or more users, instructions for the causal loop designer, etc.

Figure 2:
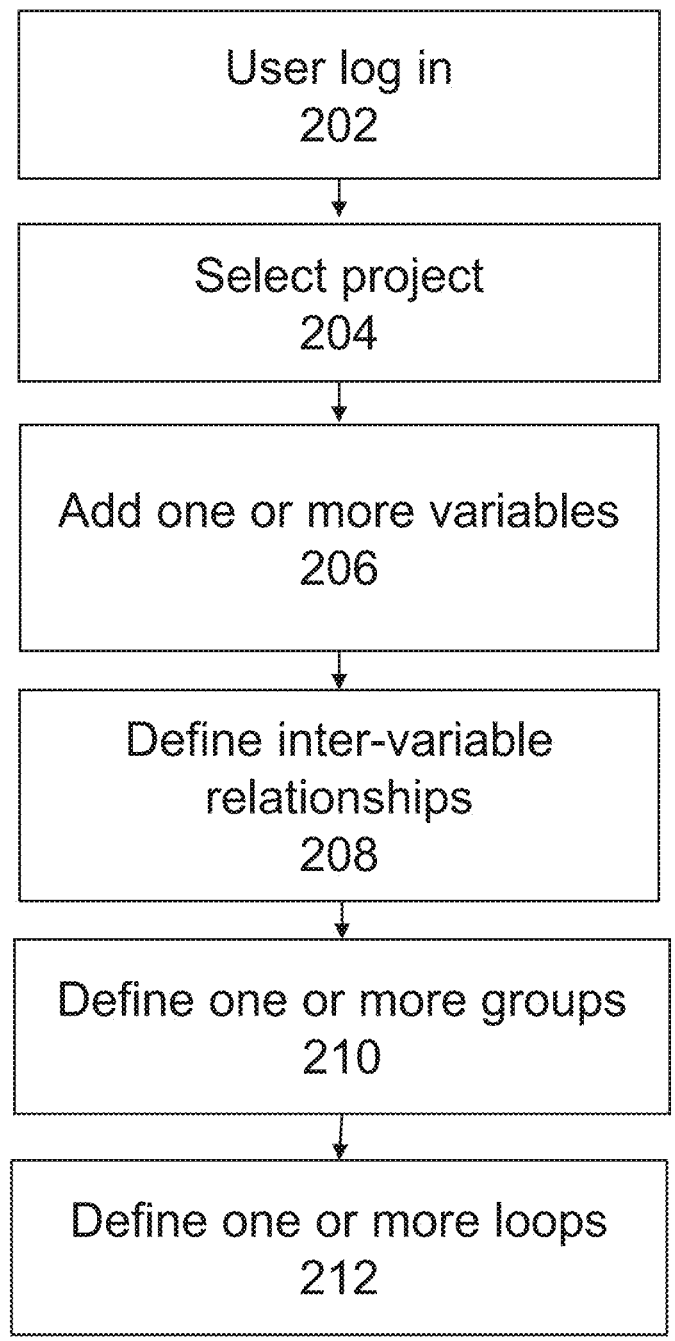
FIG. 2 depicts a process for a user to create a causal loop diagram using a CLD, in accordance with one or more examples.

FIG. 2 depicts a process 200 for a user to create a causal loop diagram using a causal loop designer, in accordance with one or more examples. The process 200 can begin with step 202, where a user can log in to an account on causal loop designer. The user may perform step 202 using a user device, such as user device 108 of system 100. In one or more examples, the user may access the causal loop designer using a web browser.

If the user does not already have an account, the user may be prompted to register a new account with the causal loop designer. Registered users of the causal loop designer will each have unique login credentials. The unique login credentials for each registered user may be associated with user data via a database, such as database 104 of system 100. The login credentials may be stored in the database and can include levels and user privileges that determine what features of the causal loop designer a given user can access and/or utilize. For example, a user may have administrator privileges that enable the user to access every diagram created by all users of the causal loop diagram, or a user may have default privileges enabling the user to create and edit only their own causal loop diagrams using the causal loop designer. In one or more examples, and as will be described further below, a user may optionally share access and or editing rights to one or more diagrams the user created with other users. When sharing access or editing rights, the user may optionally select to share such rights with all users of the system, or to share such rights only with specific individuals.

After logging into an account at step 202, the process 200 can proceed to step 204 where the user can select a project. When selecting a project, the user may, in one or more examples, select to start a new project. Alternatively, the user select an existing project that the user has created, or select an existing project that has been shared with that user. In further examples, the user may be able to select a publicly-shared project which has been created by a third-party user and/or a system administrator. If a user opts to start a new project, the user may be prompted to define metadata about the project such as a project name and/or a short text description about the project. The metadata for each project can be stored in a database, such as database 104 of system 100. In one or more examples, the causal loop designer can be configured to save an entire history of changes to a diagram, which ensures that users of the diagram do not have to worry about version control issues on shared diagrams that are collaboratively edited by multiple users. Saving the entire history of changes to a diagram can also enable users to recover prior versions of the diagram.

Figure 3:
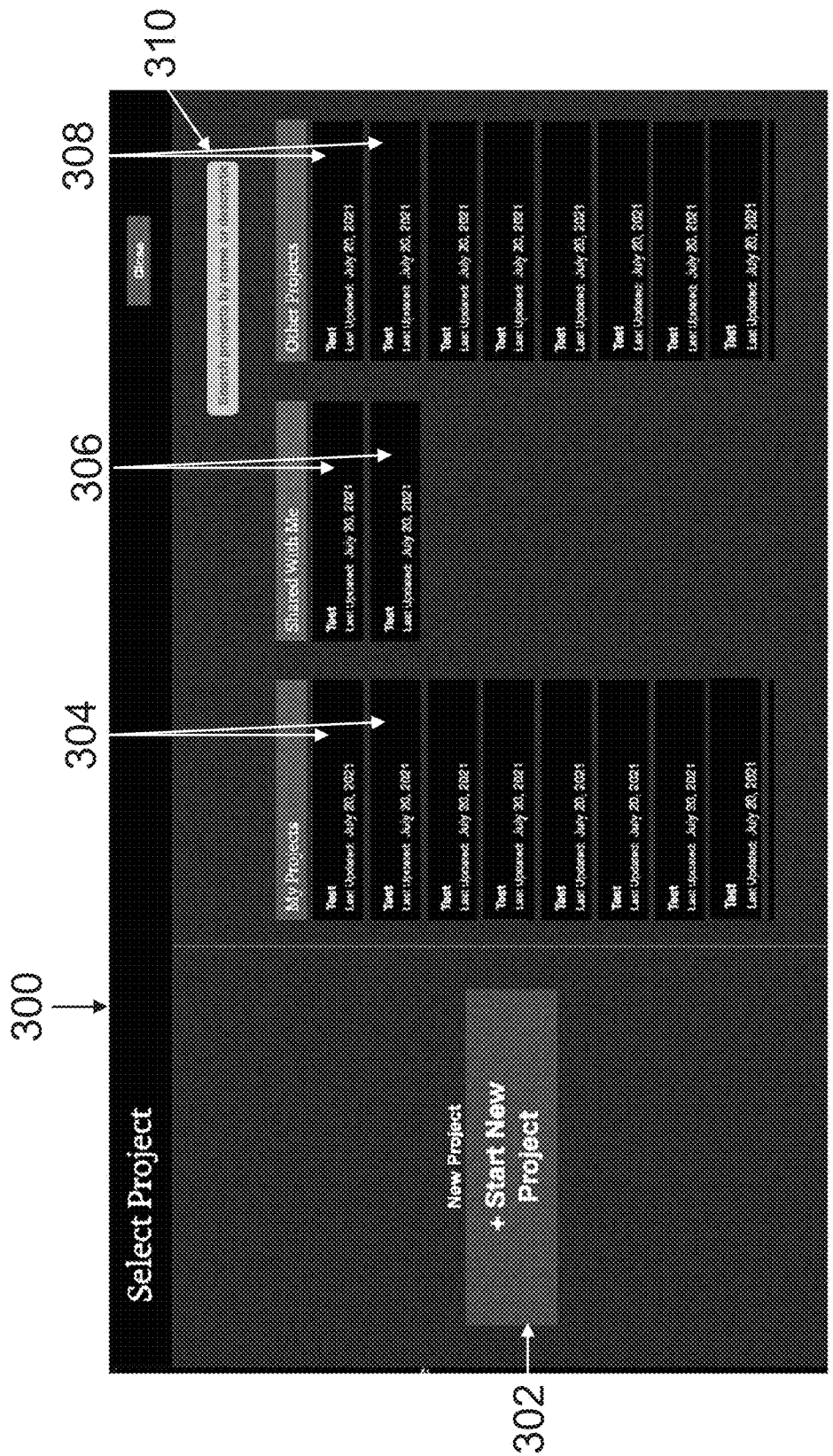
FIG. 3 depicts an exemplary user interface for a user to select a project when creating a causal loop diagram using a CLD, in accordance with one or more examples.

FIG. 3 depicts an exemplary user interface 300 for a user to select a project when creating a causal loop diagram using a CLD, in accordance with one or more examples. As shown in FIG. 3, the user interface 300 can include a selectable new project icon 302 for the user to start an entirely new project. The user interface 300 can also include selectable user project icons 304, which enable the user to select an existing project that user has created. The user interface 300 can also include selectable shared project icons 306, which identify projects created by another user that have been shared with this particular user. The shared projects may enable the user to have full edit/view access, or only viewing access of the project. The user interface 300 can also include other selectable public project icons 308, which represent public projects created by other users that have been specified as public projects by those other users. The user interface 300 may also include a search bar 310, which enables the user to search for a specific project within each of the user's current projects, the projects shared with the user, or the public projects shared by other users. The search bar 310 may employ a string search that compares a user's search terms inputted into the search bar 310 to the stored metadata associated with each searchable project within the causal loop designer.

Figure 4:
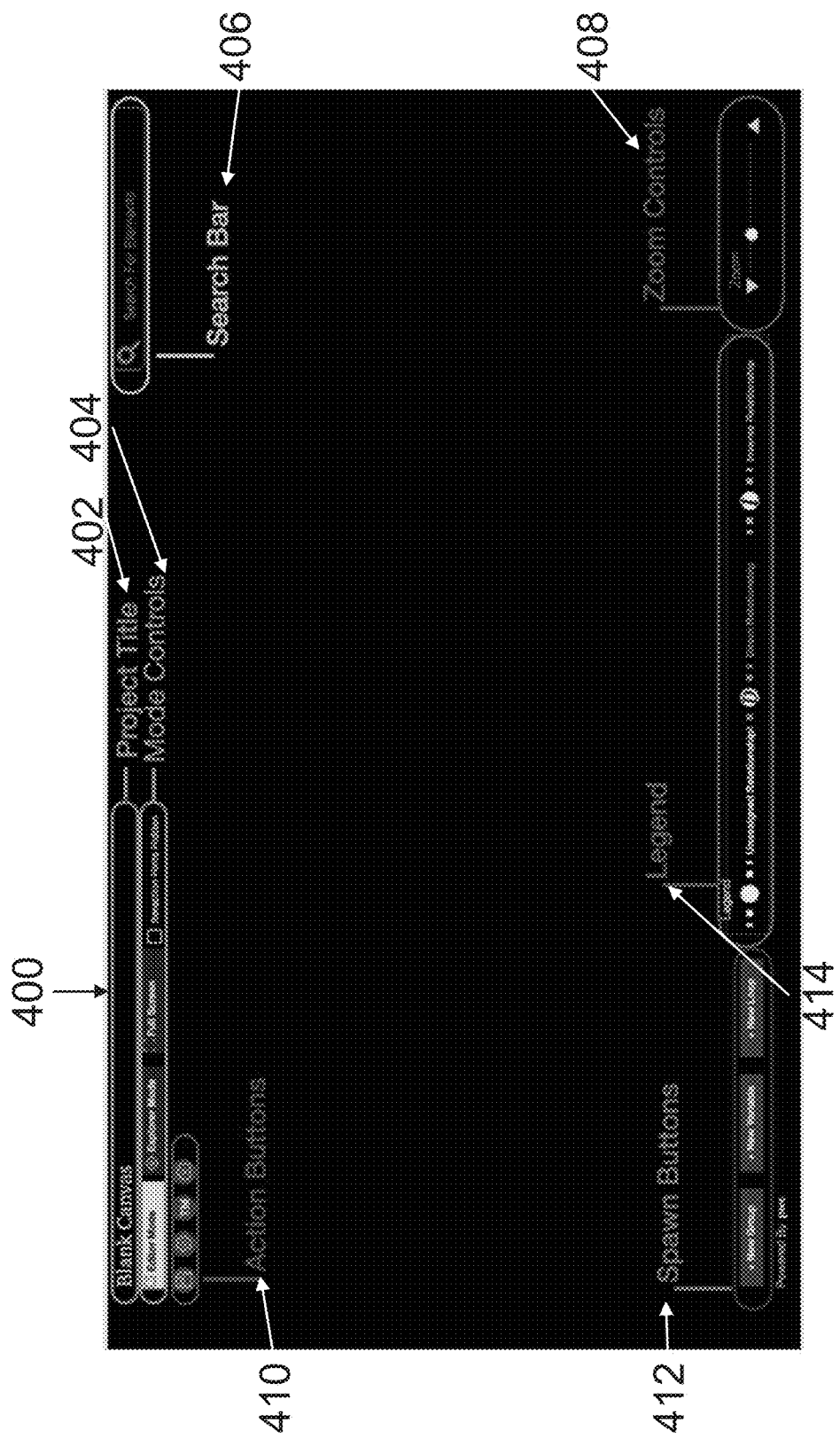
FIG. 4 depicts an exemplary user interface showing a canvas for a user to edit a causal loop diagram in an editor mode of a CLD, in accordance with one or more examples.

FIG. 4 depicts an exemplary editor mode user interface 400 for a user to edit a causal loop diagram in an editor mode of a causal loop designer, in accordance with one or more examples. If the user selected to start a new project or to open a project that the user has the right to edit, the user may open the project in an editor mode. Conversely, if the user only has the right to view a project, upon selecting the project the user may open the project in an explorer mode, which will be discussed further below.

As shown in FIG. 4, the editor mode can include a variety of icons, which enable the user to edit and/or design a causal loop diagram. The user may, for example edit the project title 402, change the project mode using one or more mode controls 404, use a search bar 406 to search for particular variables and/or elements that have been defined in the diagram, zoom in or out using zoom controls 408, access settings or export features using the action buttons 410 and/or add new elements to the diagram using one or more of the spawn buttons 412. The action buttons 410 can enable a user to save, edit, share, and/or export a diagram, in non-limiting examples. The spawn buttons 412 can, in one or more examples, enable a user to add a new group, a new variable, and/or a new loop to the diagram.

As shown in FIG. 4, the editor mode is blank and does not yet include any elements or defining features. If at step 204 of process 200 the user selected to start a new project, user interface 400 provides an example of a blank interface that the user may view and edit. If the user alternatively selected to open an editable existing project, the user editor mode canvas may display one or more existing variables, relationships, groups, and/or loops that have been previously added and defined.

Referring back to FIG. 2, after selecting one of the selectable projects at step 204, the process 200 can proceed to step 206 where the user can add one or more variables to the project. As explained above, a variable represents any measurable quantity or entity in the real world, with the measurement being a qualitative or a quantitative measurement. For example, a variable can represent the time required for an employee to perform a certain task, which can be quantitatively measured, or the impact of performing that task on an employee's satisfaction, which can be qualitatively measured. Using the causal loop designer, a user can create variables that represent physical or abstract things that exist in the real world, such as business units, profitability, consumers, etc.

When adding a new variable to a canvas, a user may select a button and drag the new variable to the desired location within the canvas. The user may add variables to a project using a spawn button such as one of the spawn buttons 412 shown in user interface 400. When adding a new variable, the variable may be named "New Variable" by default, or may have some other default name. The user can leave the default variable name or rename the new variable to some other name.

Figure 5A:
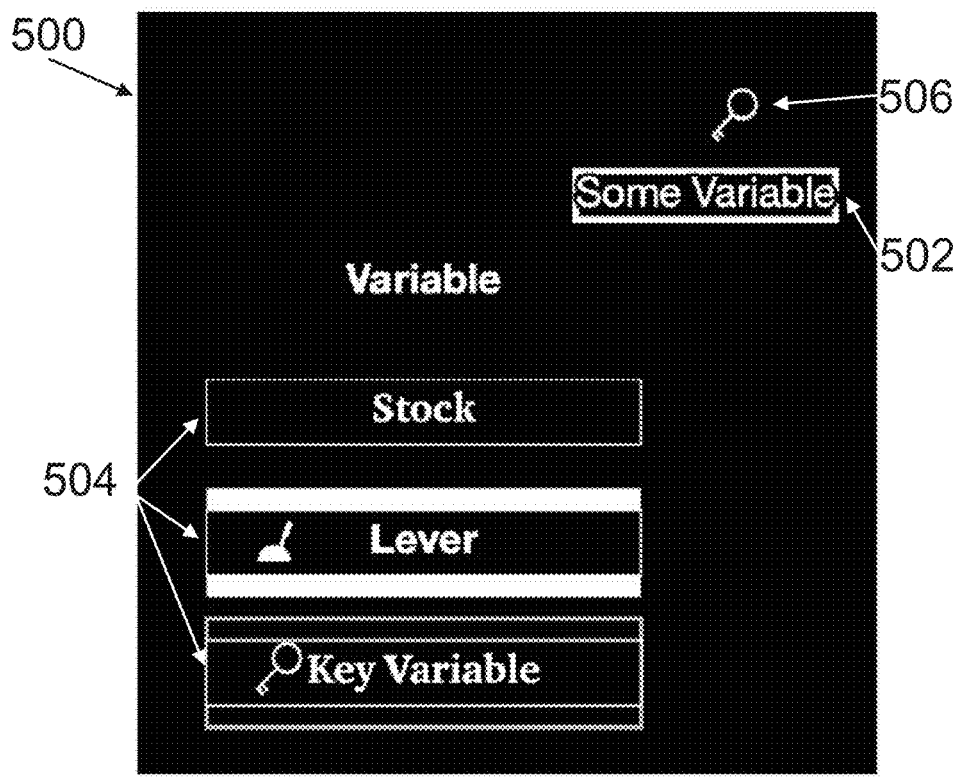
FIG. 5A depicts an exemplary user interface showing how a user can define a variable type using a CLD, in accordance with one or more examples.

FIG. 5A depicts an exemplary user interface 500 showing how a user can define a variable type using a causal loop diagram, in accordance with one or more examples. When adding a new variable to the canvas, the user may assign the variable a certain variable type. Alternatively, a user may edit an existing variable within the editor mode at any time to assign or change the variable type of that variable. For example, variable types can include, in non-limiting examples, a stock, a lever, or a key variable. Each variable type can be represented visually in a unique manner by a certain emphasis and/or icon 504. For example, each variable in a diagram that is a stock may be represented with the same icon 504. As shown in FIG. 5A, the variable 502 named "Some Variable" has been defined as a key variable, as illustrated by the variable type icon 506 depicted above the variable 502.

In one or more examples, users can also identify certain attributes about an element within the diagram using an attribute menu. The attributes assigned to a particular element can impact how the element is visually depicted in the diagram in semantically-meaningful ways. For example, if a user defines a variable as a particular variable type, the variable type may be indicated by a particular icon displayed above the variable, as discussed above. Attributes of a variable that can be defined in an attribute menu can include variable type, a short written description of the variable, and/or a reference pattern of the variable. A reference pattern is an indicator regarding how a variable is expected to increase, decrease, or otherwise change over time. Attributes of a relationship can include a relationship type and/or a description. Attributes of a loop may include a loop type and/or a description. Finally, attributes of a group may include a group description.

Figure 5B:
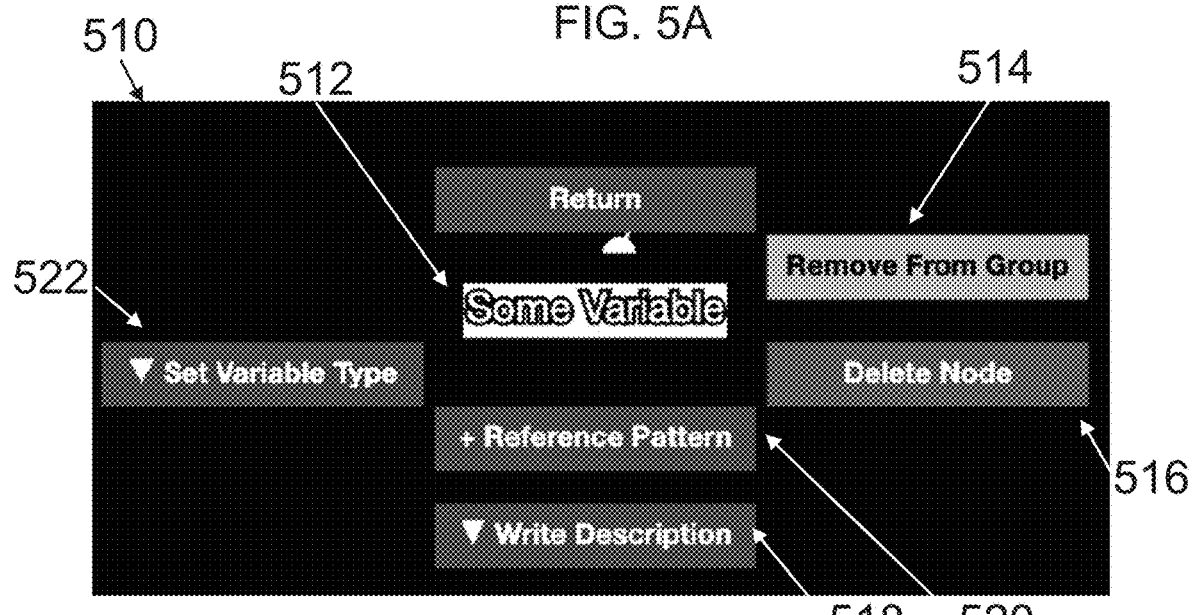
FIG. 5B depicts an exemplary user interface showing a variable attribute menu for a user to define attributes about a variable using a CLD, in accordance with one or more examples.

FIG. 5B depicts an exemplary user interface 510 showing a variable attribute menu for a user to define attributes about a variable using a causal loop diagram, in accordance with one or more examples. The attribute menu can include selectable icons enabling a user to set a variable type 522, define a reference pattern 520, write a description 518, remove the variable from a group 514, or delete the variable 516. As explained above, once a user assigns a particular attribute to an element, those attributes can be displayed on the diagram. For example, each attribute may include a particular icon such that when the element is assigned the attribute, the element will be displayed with the corresponding icon for the attribute. Thus, by including visual indicators regarding attributes of elements within the causal loop diagram, the causal loop designer can provide a visual emphasis to the element. Such visual emphasis can be helpful to understand the causal loop diagram in an efficient manner because a user can quickly locate particular elements based on attributes and quickly appreciate the significance of elements based on their attributes.

Once a user has added at least two variables to a particular diagram, the user can connect those variables and define a relationship between them. When defining a relationship between variables, the relationship can begin as an unassigned relationship, which the user can choose to leave as is. Alternatively, the user may choose to define the relationship as a direct or inverse relationship. As explained above, a direct relationship indicates that a change in a first variable will result in a similar change in a second variable, whereas an inverse relationship indicates that a change in a first variable will result in an opposite change in the second variable.

Figure 6A:
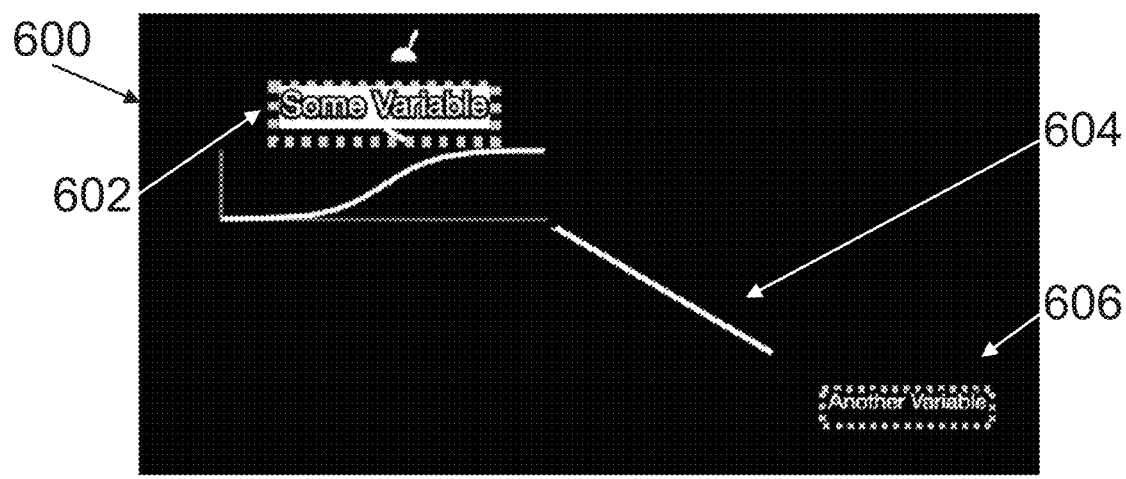
FIG. 6A depicts an exemplary user interface showing a drag and drop process for a user to create a relationship between two variables using a CLD, in accordance with one or more examples.

FIG. 6A depicts an exemplary user interface 600 showing a drag and drop process for a user to create a relationship between two variables using a causal loop designer, in accordance with one or more examples. As shown in FIG. 6A, the user interface 600 can include a first variable 602 and a second variable 606. When the user clicks on the first variable 602 and begins dragging their cursor towards the second variable 606, a connector line 604 appears on the user interface 600. In one or more examples, when the user selects a first variable and begins dragging their cursor, the causal loop designer may be configured to visually emphasize each variable within the diagram that is a valid target element to create a connection. That is, the causal loop designer can provide visual cues to indicate valid target variables to aid the user creating a connection between the first variable and another variable.

Figure 6B:
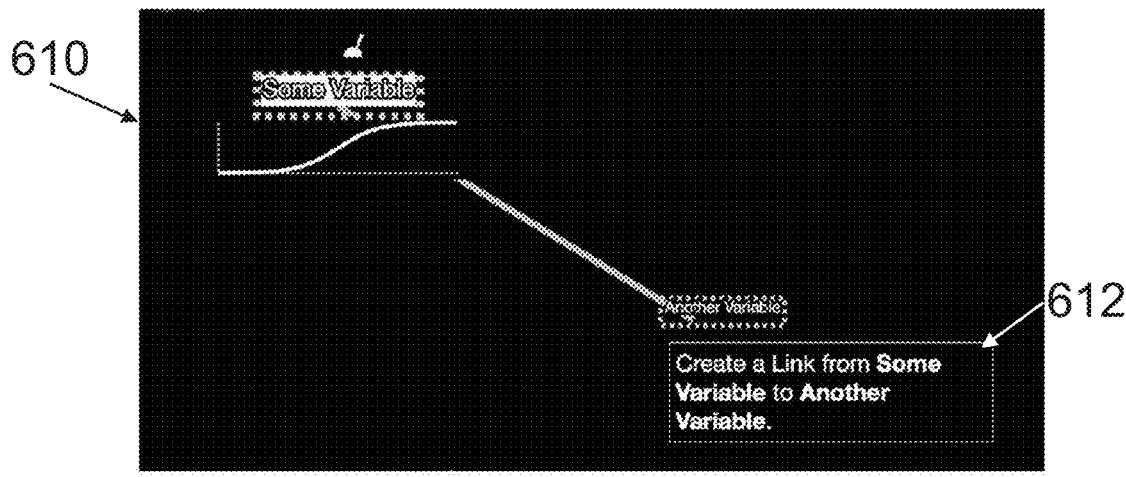
FIG. 6B depicts an exemplary user interface showing a relationship tooltip that visually illustrates a user can create a relationship between two variables using a CLD, in accordance with one or more examples.

An additional visual aid is depicted in FIG. 6B which shows an exemplary user interface 610 showing a relationship tooltip 612. The relationship tooltip 612 can visually illustrate that a user can create a relationship between two particular variables. The causal loop designer can be configured such that the relationship tooltip 612 appears on a user's screen when the user's cursor, after being dragged from a first variable, reaches a valid target for the user to create a relationship between the first variable and the target. If the user creates a valid connection, the causal loop diagram can be configured to automatically generate a relationship between the variables and store information regarding that relationship in a database such as database 104 of system 100.

Figure 6C:
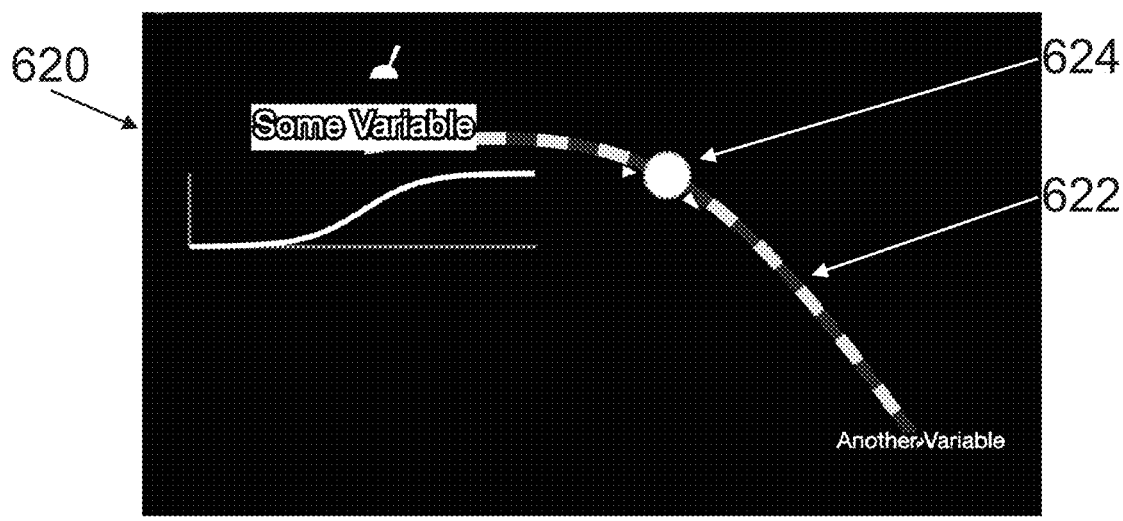
FIG. 6C depicts an exemplary user interface showing a relationship between two variables created using a drag and drop process in a CLD, in accordance with one or more examples.

FIG. 6C depicts an exemplary user interface 620 showing a relationship 622 between two variables created using a drag and drop process in a causal loop designer, in accordance with one or more examples. The relationship 622 can be identified by a relationship icon 624. The relationship icon 624 can indicate what type of relationship exists between the variables. For example, the relationship icon 624 may indicate the relationship is a direct relationship or an inverse relationship. In one or more examples, by default a new relationship will have no type and no name, but these attributes can be added by the user. The user may add attributes about a relationship using an attribute menu similar to the attribute menu shown in user interface 510. An attribute menu for a relationship may, in one or more examples, enable the user to write a description for the relationship, assign a type, and/or delete the connection.

Referring back to FIG. 2, as shown at step 210, the user can define one or more groups. As shown in process 200, the step 210 of defining one or more groups is shown after defining inter-variable relationships at step 208. It should be understood, however, that the act of defining one or more groups need not occur after defining such relationships. A user can add a group to a blank causal loop diagram before adding any other elements. That is, a group can be the first element added to a diagram, with additional elements such as variables added to the diagram and assigned to the group thereafter. Similarly, the step 212 of defining one or more loops need not occur after defining one or more groups at step 210 and can similarly be added to the diagram at any point. Variables can be assigned to a group or loop at any point. Assigning a variable to a group or loop can be accomplished using the same drag and drop procedure described above with respect to defining a relationship shown in FIGS. 6A-C.

Figure 7:
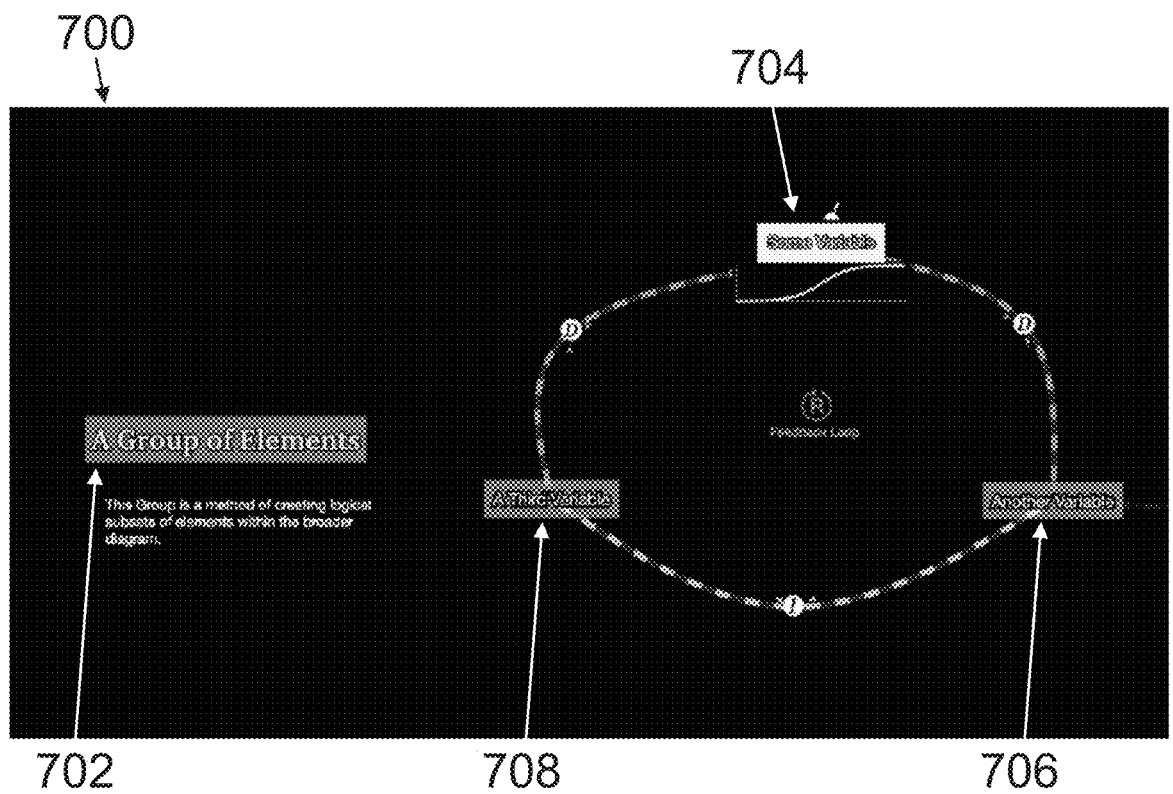
FIG. 7 depicts an exemplary user interface showing a defined group created using a CLD, in accordance with one or more examples.

FIG. 7 depicts an exemplary user interface 700 showing a group 702 of elements created using a causal loop diagram, in accordance with one or more examples. As shown, the group 702 includes a first variable 704, a second variable 706, and a third variable 708, as well as the relationships between those groups. The process of creating a group within a causal loop diagram enables users to create logical subsets of elements within the broader diagram. Such logical subsets can be useful to assess and communicate the diagram. For example, as will be explained below, a user may view a particular group in isolation from the larger diagram and can thus focus their attention on the particular group to gain a full understand of the elements within that group before turning the larger system. Such sequential view of elements within a diagram may be necessary in order to understand complex diagrams. Accordingly, the grouping feature of the causal loop designer can enhance a user's ability to both understand a complex diagram, and to communicate that diagram.

Figure 8:
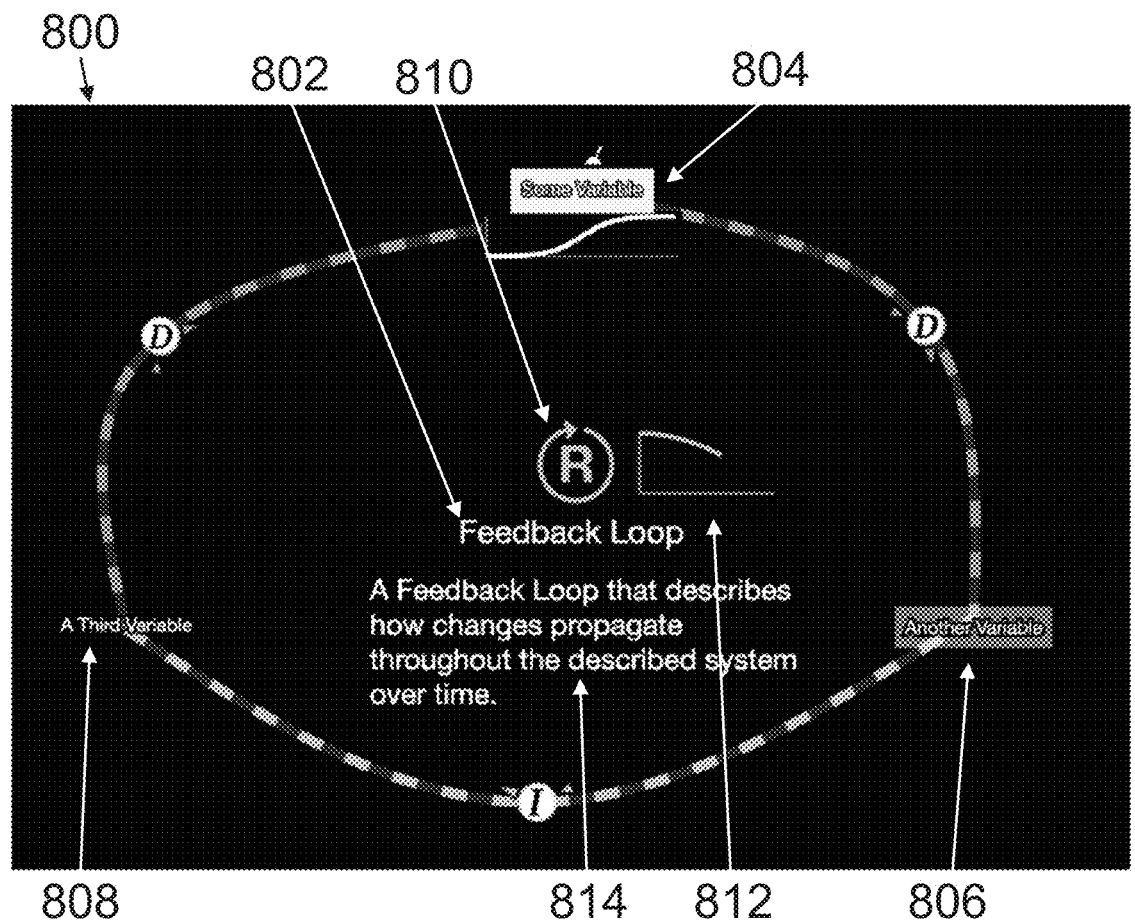
FIG. 8 depicts an exemplary user interface showing a defined loop created using a CLD, in accordance with one or more examples.

FIG. 8 depicts an exemplary user interface 800 showing a loop 802 created using a causal loop designer, in accordance with one or more examples. As shown, the loop 802 includes a first variable 804, a second variable 806, and a third variable 808. In addition, the user interface 800 can also include a loop icon 810, a loop reference pattern 812, and/or a loop description 814.

In one or more examples, the causal loop designer can include various visual hints or instructions to aide users when creating diagrams. For example, as explained above with respect to the drag and drop functionality, the causal loop designer can include tooltips that appear when users are creating a relationship between variables. Similarly, other tooltips can be displayed to facilitate users creating, editing, or viewing diagrams in the causal loop designer. By providing tooltips, the causal loop designer improves the usability of the causal loop designer and enables even beginner users to utilize the causal loop designer, which enables broader sharing of causal loop diagrams created via the causal loop designer.

Figure 9:
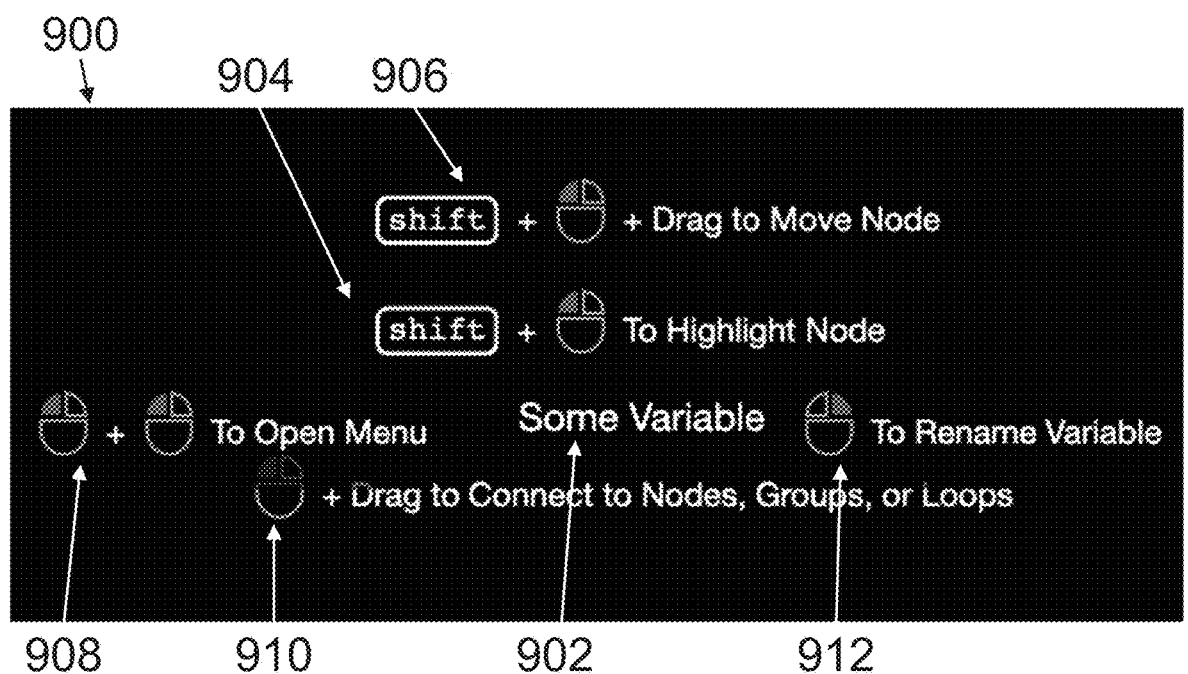
FIG. 9 depicts an exemplary user interface showing a user tooltip menu illustrating possible operations a user can perform with respect to a variable and how to perform the operations, in accordance with one or more examples.

FIG. 9 depicts an exemplary tooltip user interface 900 displaying tips for a user to operate a causal loop diagram, in accordance with one or more examples. As shown in FIG. 9, the tooltip user interface 900 includes a variety of tooltips regarding a variable 902, such as a drag tooltip 906, a highlight tooltip 904, a menu tooltip 908, a connection tooltip 910, and a rename tooltip 912. In one or more examples, each tooltip can correspond to a gesture and a corresponding action that gesture will execute. One such gesture can include a right click or alt click gesture, which may result in changing the name of an element in the diagram. A shift click gesture can result in the user being able to drag and move an element around within the canvas of the diagram. A shift and click can also, and/or alternatively, enable a user to highlight an element within the diagram, as will be described further below. A click and drag gesture can enable a user to connect a variable to another variable, connect a variable to a loop or vice versa, and/or connect a variable to a group or vice versa. Finally, a double click gesture can result in opening a deeper focus detail view providing more details regarding the element of interest that was selected via a double click, as will be discussed below.

As explained above, users may be able to interact with a causal loop diagram in the causal loop designer in an editor mode or an explorer mode. The causal loop designer can be configured to automatically save any changes made to a causal loop diagram in the editor mode. In one or more examples, the changes can be saved in a database such as database 104 of system 100. Furthermore, the causal loop designer can be configured to save an entire history of changes to a diagram, which ensures that users of the diagram do not have to worry about version control issues on shared diagrams that are collaboratively edited by multiple users. In one or more examples, all edits to a diagram made while in the editor mode will be reflected in the explorer mode.

Figure 10:
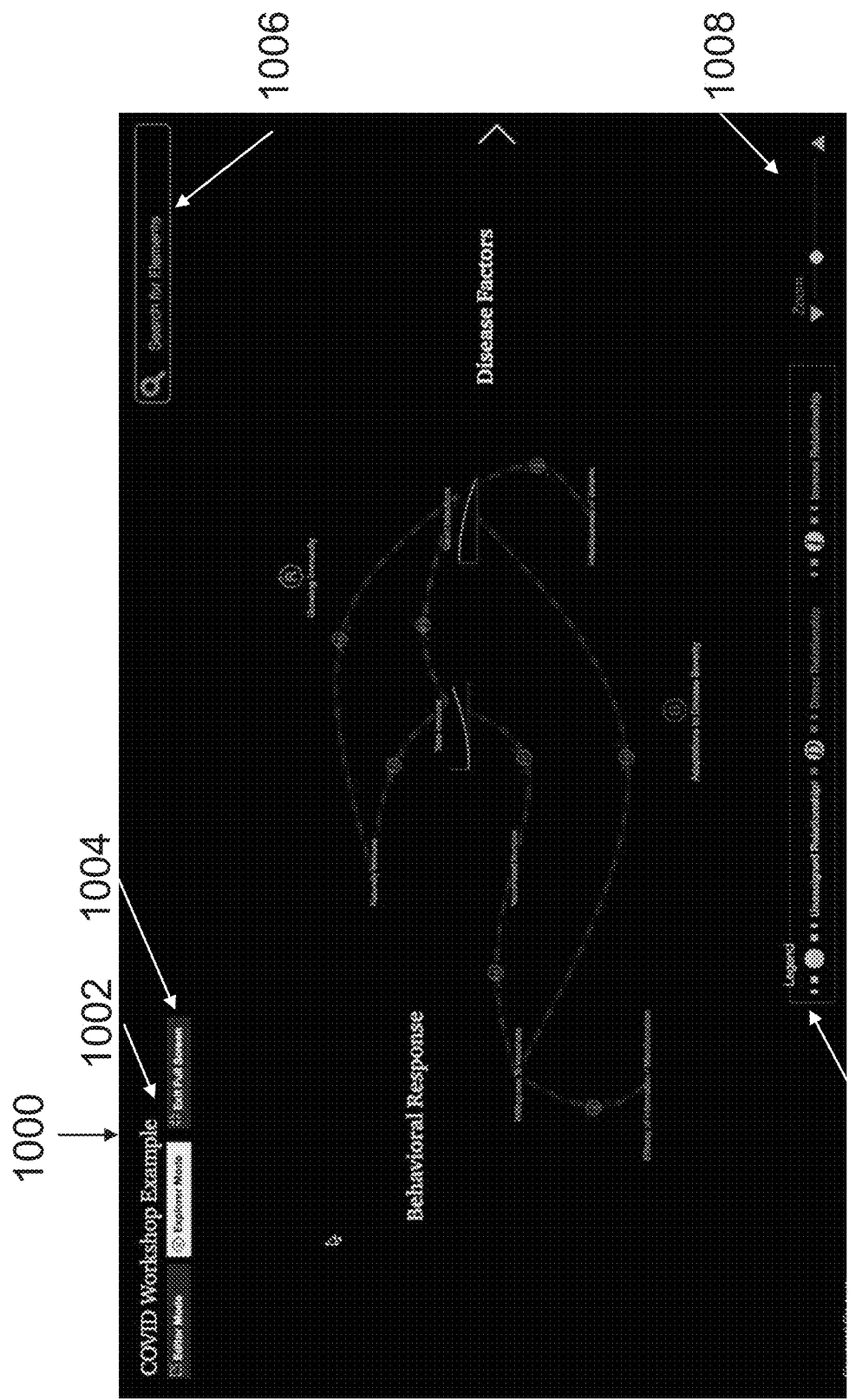
FIG. 10 depicts an exemplary explorer mode user interface 1000 for a user to explore a causal loop diagram in an explorer mode of a causal loop designer, in accordance with one or more examples.

FIG. 10 depicts an exemplary explorer mode user interface 1000 for a user to explore a causal loop diagram in an explorer mode of a causal loop designer, in accordance with one or more examples. As shown in FIG. 10, the explorer mode can include a variety of icons that enable the user to interact with an existing causal loop diagram. The explorer mode user interface 1000 can include a project title 1002 and one or more mode controls 1004. The mode controls 1004 can be used to toggle the causal loop designer between the editor and explorer modes. In one or more examples, a user may also toggle between modes using a keyboard shortcut such as by pressing a tab key.

As explained above, the more complicated a causal loop diagram becomes, the less readable the diagram becomes. Accordingly, in one or more examples, the causal loop designer can include various functionalities that enable a user to view isolated elements or areas of the diagram in order to improve the readability of a complex diagram. Beneficially, by enabling users to view elements within a complex diagram in isolation, users can view impactful aspects of the diagram individually and/or sequentially in order to discern how those elements interact with other elements and affect the system dynamics as a whole. Such functionalities capable of improving readability can include a search bar, zoom function, an interactive legend, and/or a deeper focus detail view.

As shown in FIG. 10, in one or more examples, the explorer mode user interface 1000 can also include a search bar 1006 and zoom controls 1008 which enable a user to view particular elements within a complex diagram by zooming in or out to the appropriate level or locating those elements using the search bar. Such zoom functionality can be particularly useful with respect to large complex diagrams. The search bar 1006 can operate similarly to the search bar 406 of FIG. 4 as discussed above. The search bar can improve the readability of a complex causal loop diagram, as elements located by the search bar 1006 can be visually emphasized within the diagram which enables users to quickly find relevant elements within the diagram. Furthermore, if the diagram has been shared with a particular user, the user may not know whether the diagram contains a specific type of variable, but can use the search bar to hunt for such variables. Thus, the search bar 1006 also improves the interactivity of the diagram by enhancing users' ability to collaboratively share diagrams and utilize those diagrams in an efficient manner.

The explorer mode user interface 1000 can also include a legend 1012. The legend can include legend icons indicative of the various types of relationships within the diagram. In one or more examples, the legend icons can include an icon corresponding to unassigned relationships, an icon corresponding to direct relationships, and/or an icon corresponding to inverse relationships. In one or more examples, a user can hover their cursor over one of the icons in the legend to learn more information about the type of icon. For example, if a user hovers over a direct relationship icon, the explorer user interface 1000 can display information that explains what a direct relationship is. In one or more examples, hovering over a type of icon in the legend can cause the corresponding relationships in the diagram of that type to be visually emphasized in the diagram. For example, if a user hovers over the direct relationship icon, every direct relationship within the causal loop diagram may be visually emphasized. In one or more examples, visual emphasis can be accomplished by highlighting the relevant elements within the diagram with a certain unique color. For example, hovering over the direct relationship icon may cause all direct relationships to be emphasized with a contrasting color relative to other elements in the diagram.

Figure 11:
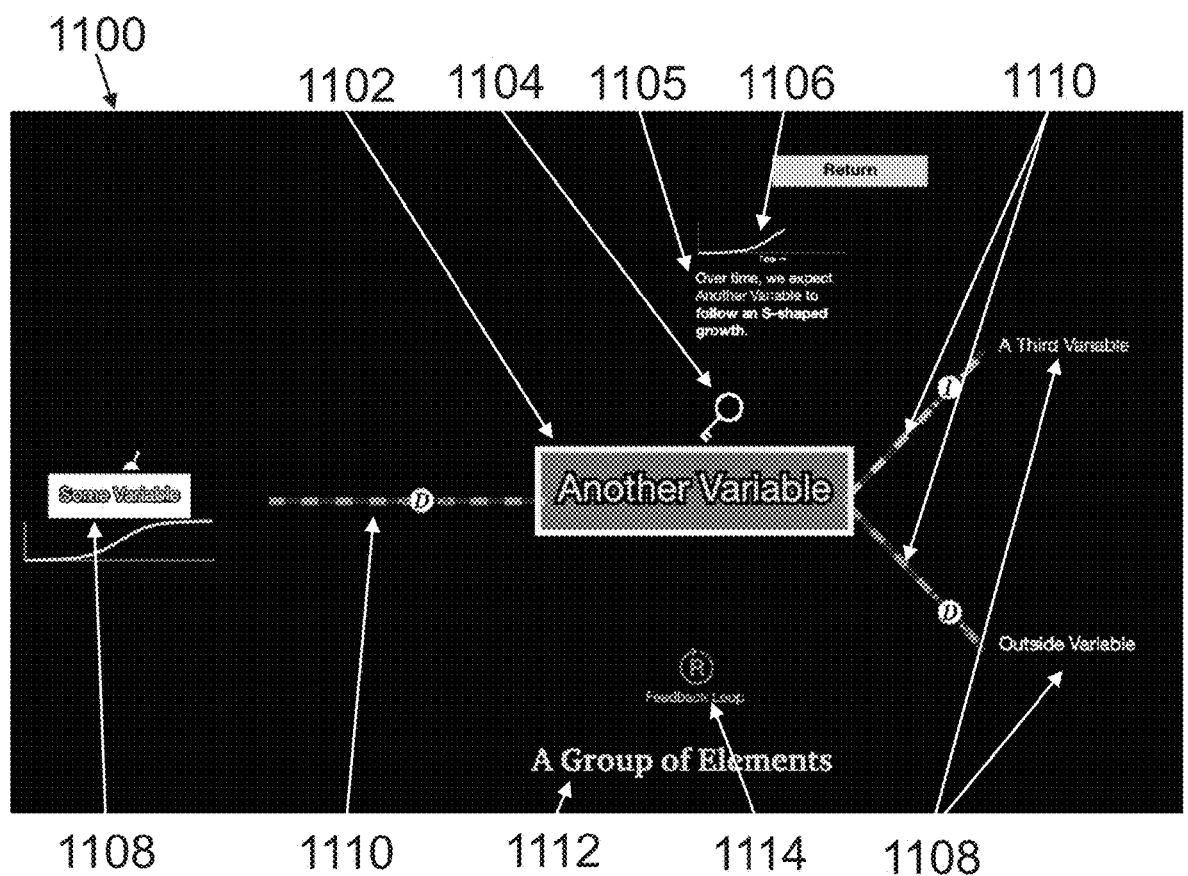
FIG. 11 depicts an exemplary user interface showing a double click functionality of an explorer mode of a CLD with respect to a variable, in accordance with one or more examples.

FIG. 11 depicts an exemplary deeper focus user interface 1100 showing a detail view of a variable in an explorer mode of a causal loop diagram created in a causal loop designer, in accordance with one or more examples. As explained above, a double click gesture can result in opening a deeper focus view providing more details regarding a selected element. In one or more examples, the double click gesture can trigger an animated transition, which is displayed on the user interface when transitioning to the deeper focus detail view. The animated transitions can allow users to understand the spatial relationship between the components of interest in the deeper focus detail view and the broader diagram. For example, if a user double clicks on an element located in the upper right corner of a complex causal loop diagram, the animated transition may appear to zoom upwardly and to the right to emphasize the location of the selected element within the larger causal loop diagram. In one or more examples, upon returning to the previous view of the entire causal loop diagram, another transition animation can be displayed.

As shown in FIG. 11, the deeper focus user interface 1100 provides a detail view regarding a variable 1102. The deeper focus user interface 1100 can include information such as a variable type icon 1104, a description 1105, and a reference pattern icon 1106, as described above. The deeper focus user interface 1100 can also include information regarding variables connected to the variable of interest and/or any loops or groups of which the variable is a member. For example, as shown in FIG. 11, the variable 1102 is connected to other variables 1108 via relationships 1110, and is a member of a group 1112 and a loop 1114.

Figure 12:
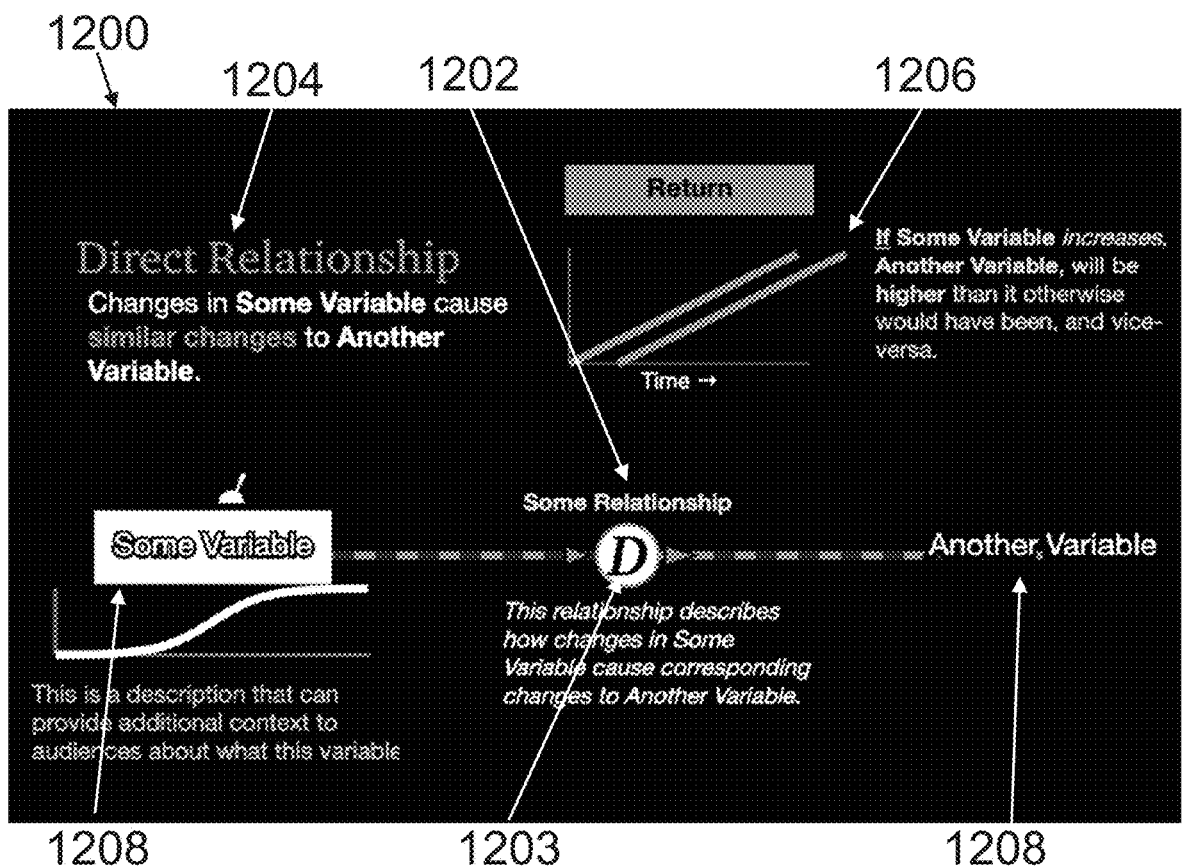
FIG. 12 depicts an exemplary user interface showing a double click functionality of an explorer mode of a CLD with respect to a relationship, in accordance with one or more examples.

FIG. 12 depicts an exemplary deeper focus user interface 1200 showing a detail view of a relationship in an explorer mode of a causal loop diagram created in a causal loop designer, in accordance with one or more examples. As shown in FIG. 12, the deeper focus interface 1200 provides a detail view regarding a relationship 1202. The deeper focus user interface 1200 can identify the relevant variables 1208 corresponding to the relationship, and can include information about the nature of the relationship such as a relationship icon 1203, information regarding the type of relationship 1204, and a reference pattern icon 1206. Beneficially, by providing a detail view regarding a relationship within a complex causal loop diagram, the deeper focus user interface 1200 enables users to assess how changes might propagate through the system via that relationship. As explained above, a double click gesture can result in opening the deeper focus view. In one or more examples, the double click gesture can trigger an animated transition, which is displayed on the user interface when transitioning to the deeper focus detail view. The animated transitions can allow users to understand the spatial relationship between the components of interest in the deeper focus detail view and the broader diagram.

Figure 13:
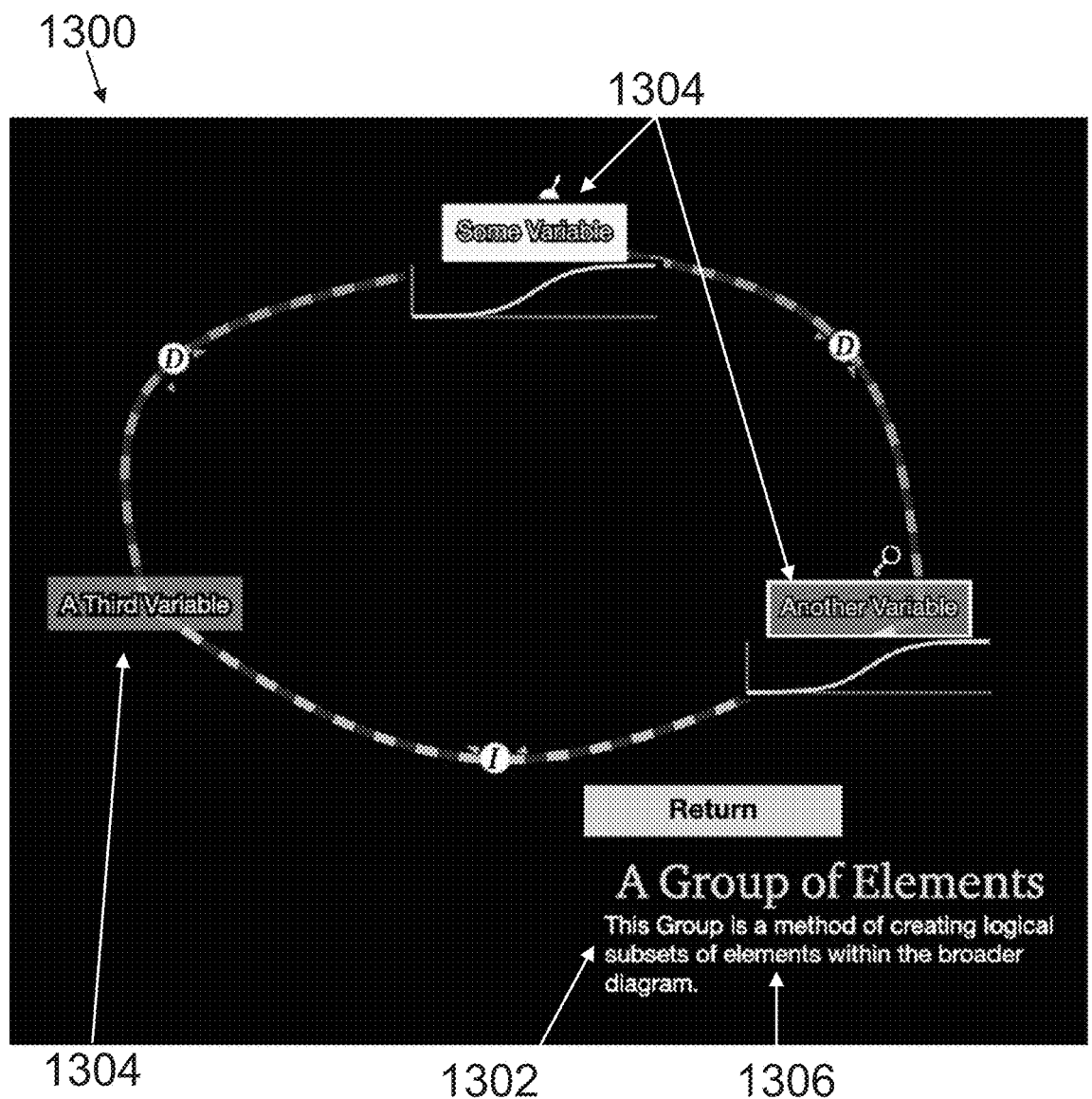
FIG. 13 depicts an exemplary user interface showing a double click functionality of an explorer mode of a CLD with respect to a loop, in accordance with one or more examples.

FIG. 13 depicts an exemplary deeper focus user interface 1300 showing a detail view of a group 1302 in an explorer mode of a causal loop diagram created in a causal loop designer, in accordance with one or more examples. The deeper focus user interface 1300 of a group 1302 can include all elements within a group of a diagram, including variables 1304, relationships between variables, and/or loops, as well as identifying information about those elements. The deeper focus user interface 1300 can also include identifying information 1306 about the group 1302. Such identifying information 1306 can include, for example, the name of the group and/or a written description regarding the group. The detail view regarding a single group of a larger diagram, as shown in deeper focus user interface 1300, is useful for the same reasons as explained above. For example, the user can view the elements of a specific group in isolation and focus their attention on that group until they are ready to return to the larger complex diagram, which improves the readability of a complex diagram by enabling users to sequentially digest the information contained in the diagram. As explained above, a double click gesture can result in opening the deeper focus view. In one or more examples, the double click gesture can trigger an animated transition, which is displayed on the user interface when transitioning to the deeper focus detail view. The animated transitions can allow users to understand the spatial relationship between the components of interest in the deeper focus detail view and the broader diagram.

Figure 14:
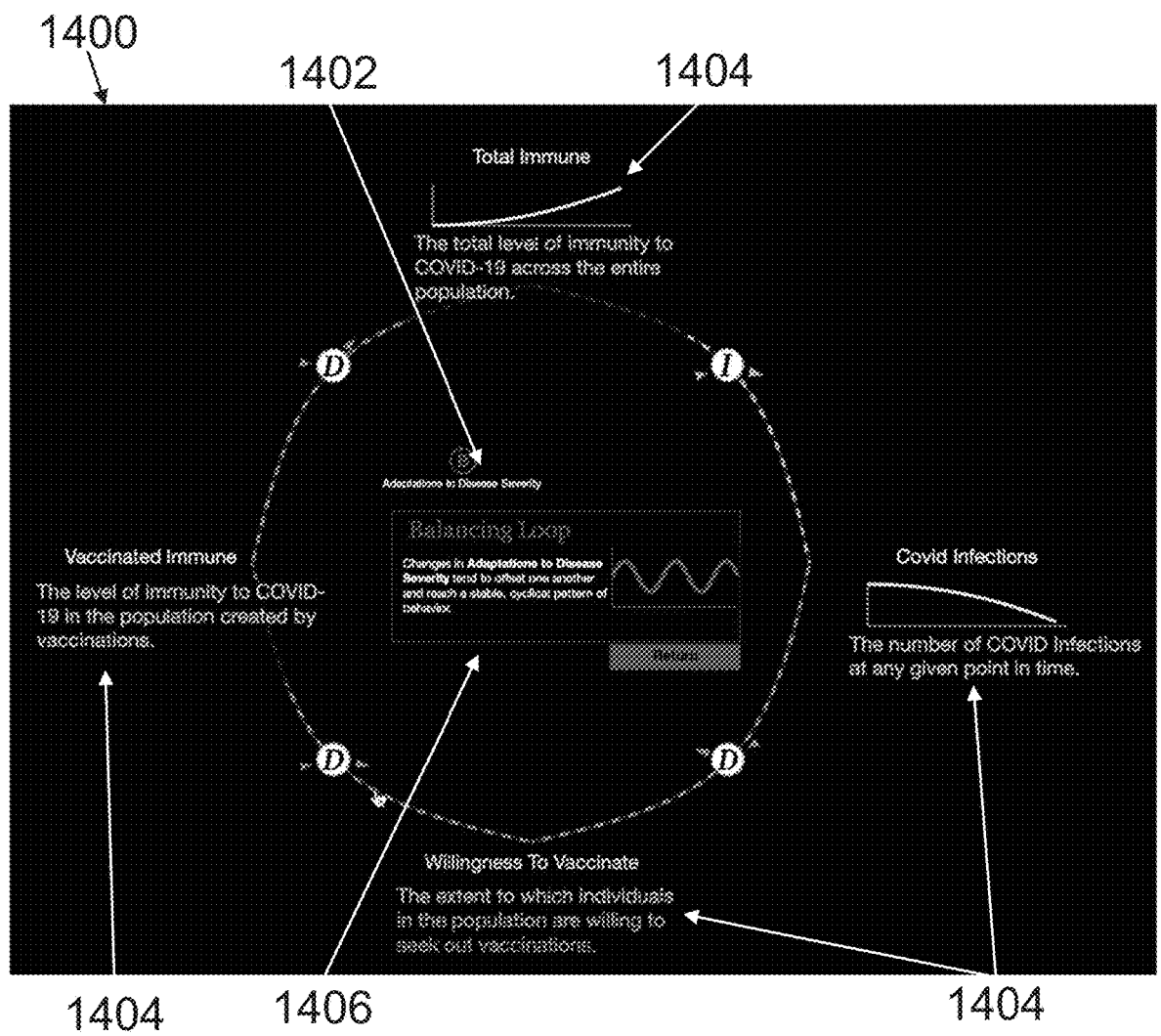
FIG. 14 depicts an exemplary user interface showing a double click functionality of an explorer mode of a CLD with respect to a group, in accordance with one or more examples.

FIG. 14 depicts an exemplary deeper focus user interface 1400 showing a detail view of a loop 1402 in an explorer mode of a causal loop diagram created in a causal loop designer, in accordance with one or more examples. As shown in FIG. 14, the deeper focus user interface 1400 can include each variable 1404 within the loop 1402, as well as any identifying information about those variables such as a reference pattern, variable type icon, and/or a description, as discussed above. The deeper focus user interface 1400 can also include identifying information 1406 about the loop 1404.

Identifying information 1406 about a loop can include information regarding the type of a loop, a reference pattern icon, the name of the loop, and/or a written description about the loop. As explained above, a loop can be a reinforcing loop, meaning the loop includes variables that are related to one another such that these relationships can be used to predict growth or decay, or the loop can be a balancing loop including at least one variable that is inversely related to another variable and can be used to analyze cyclical patterns and system stability over time. Thus, feedback loops are critically important to the analysis of a causal loop diagram because feedback loops can generate important behavior in a system and can be useful to identify the dynamics regarding how key variables behave. As explained above, a double click gesture can result in opening the deeper focus view. In one or more examples, the double click gesture can trigger an animated transition, which is displayed on the user interface when transitioning to the deeper focus detail view. The animated transitions can allow users to understand the spatial relationship between the components of interest in the deeper focus detail view and the broader diagram.

Figure 15A:
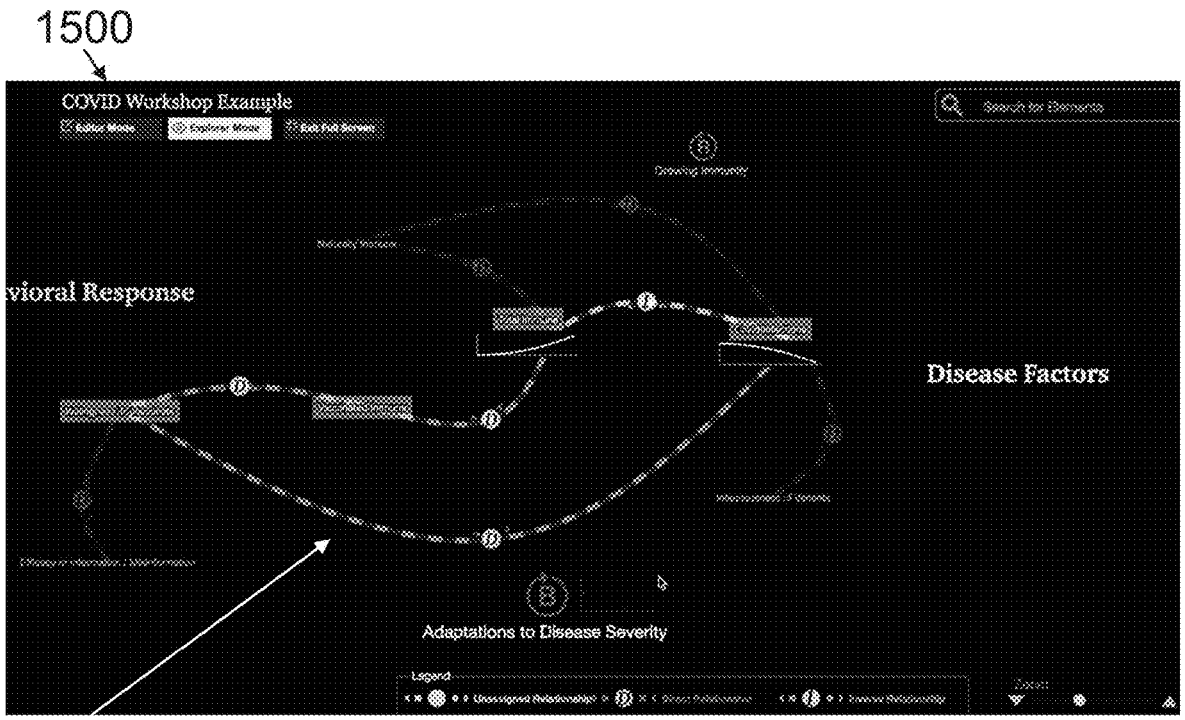
FIG. 15A depicts an exemplary user interface showing a sample causal loop diagram created by a user via a CLD, in accordance with one or more examples.
Figure 15B:
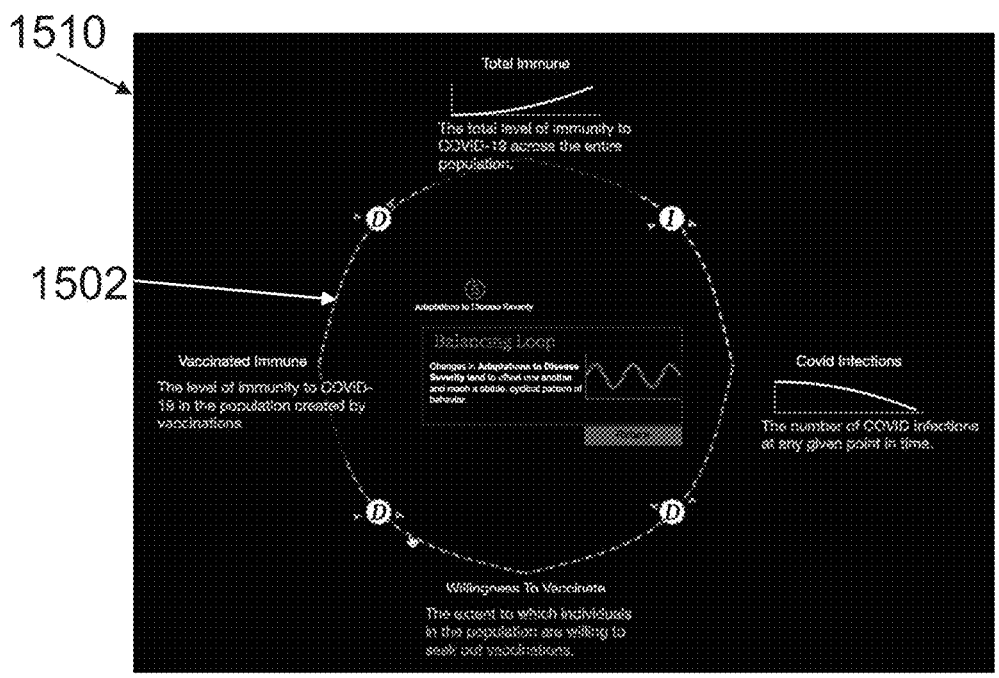
FIG. 15B depicts an exemplary user interface showing a hover functionality of an explorer mode of a CLD with respect to a variable, in accordance with one or more examples.

As explained above, the various deeper focus detail views shown in FIGS. 11-14 enable users to focus on isolated elements or areas of a larger causal loop diagram which can improve the user's ability to comprehend the meaning behind a given diagram. FIG. 15A depicts an exemplary user interface 1500 showing a loop 1502 of a causal loop diagram within the larger diagram created in a causal loop designer, in accordance with one or more examples. FIG. 15B depicts an exemplary deeper focus user interface 1510 showing a detail view of the same loop 1502 separate from the larger diagram created in a causal loop designer, in accordance with one or more examples. As demonstrated by the comparison between FIG. 15A and FIG. 15B, the deeper focus user interface 1510 removes the other elements from the diagram and displays only those elements which directly affect the behavior of the loop 1502. A user of the causal loop diagram can alternate between the user interface 1500 and the deeper focus user interface 1510 as necessary, enabling the user to focus their attention for whatever period is necessary in order to view and assess the behavior of loop 1502. Moreover, when viewing the loop 1502 within the user interface 1500, the user can discern what surrounding elements outside of the loop 1502 impact variables within the loop 1502. Thus, by enabling the user to alternate between such views, the user can easily understand not only the behavior of the loop 1502 but also how that loop affects and is effected by other elements within the diagram.

In addition to the functionalities explained thus far, the causal loop designer can also include other functionalities that foster interactivity with a causal loop diagram and improve the user's ability to understand the diagram. For example, the causal loop designer can include a hover functionality, similar to the hover functionality described above with respect to the legend 1012 of FIG. 10.

Figure 16A:
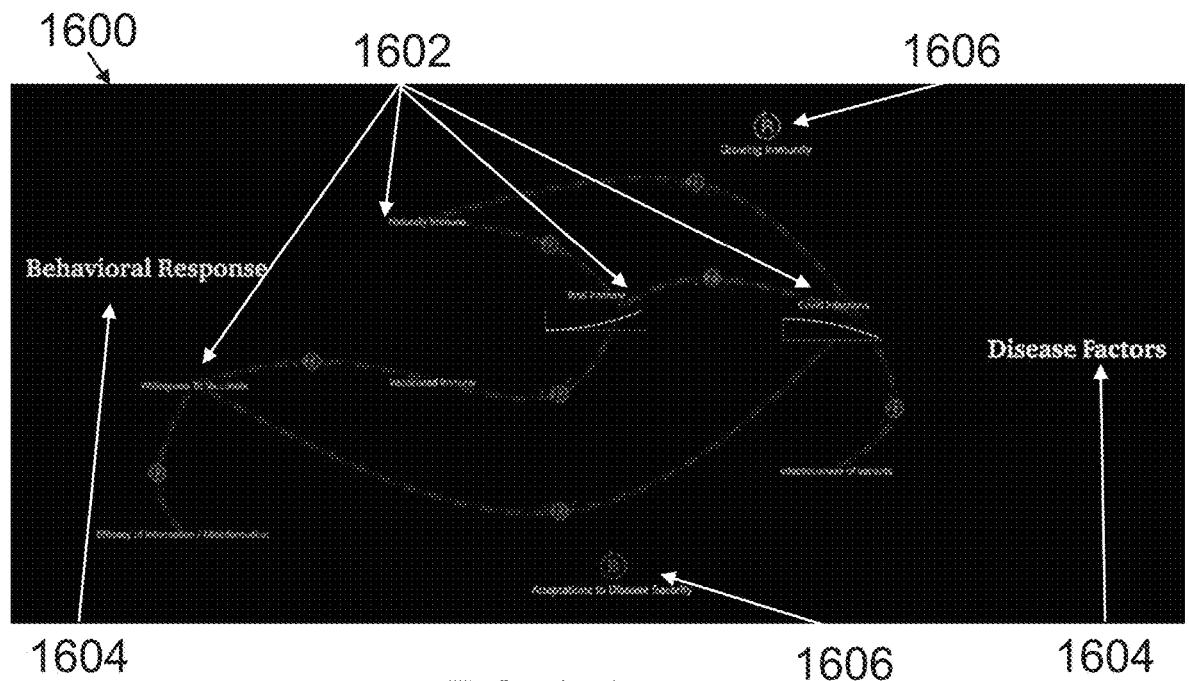
FIG. 16A depicts an exemplary user interface showing a loop of a causal loop diagram within the larger diagram created in a causal loop designer, in accordance with one or more examples.

FIG. 16A depicts an exemplary user interface 1600 showing a sample causal loop diagram created by a user via a causal loop designer, in accordance with one or more examples. The causal loop diagram shown in user interface 1600 includes multiple variables 1602, multiple groups 1604, and multiple loops 1606. As shown in FIG. 16A, no elements of the diagram are visually emphasized relative to one another.

Figure 16B:
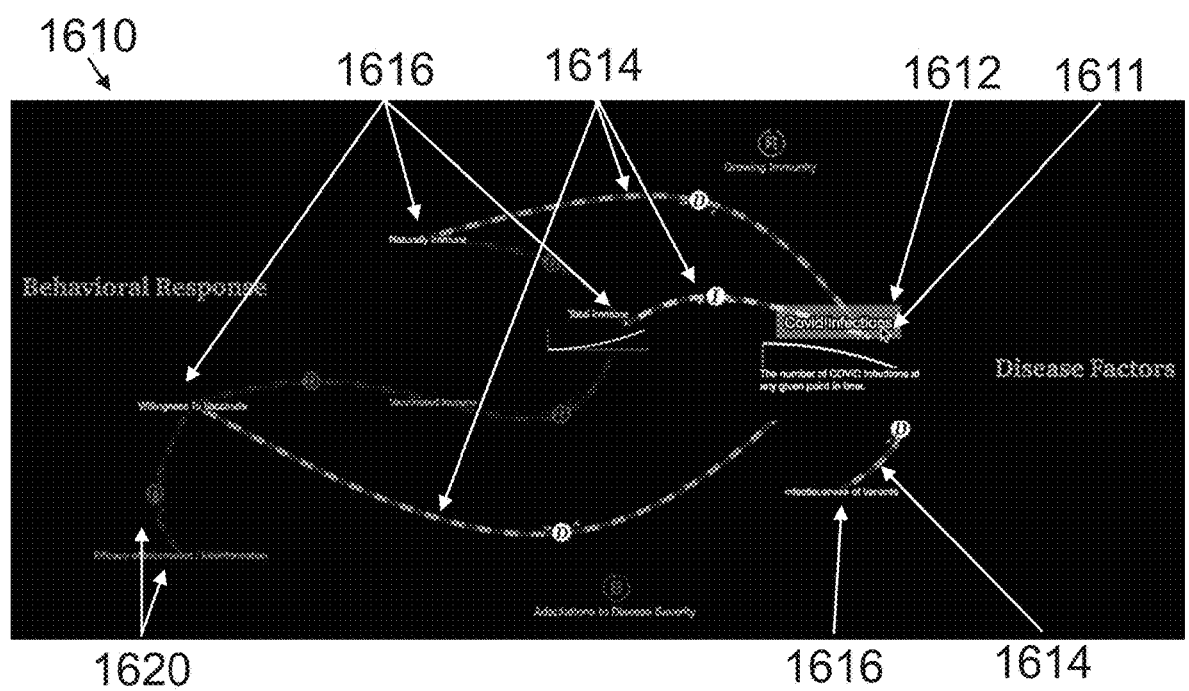
FIG. 16B depicts an exemplary deeper focus user interface showing a detail view of a loop separate from the larger diagram created in a causal loop designer, in accordance with one or more examples.

FIG. 16B depicts an exemplary hover user interface 1610 illustrating visual emphasis caused by a hover functionality in an explorer mode of a causal loop designer, in accordance with one or more examples. The hover user interface 1610 shows the same causal loop diagram as that depicted in FIG. 16A, however, in FIG. 16B, the variable 1612 has been visually emphasized using a hover functionality. Visual emphasis from a hover functionality of a variable can include visually emphasizing the variable, the variable's relationships to other variables and identification of those variables, as well as any identifying information about the variable. For example, in FIG. 16B, the cursor 1611 is located above variable 1612 (e.g., "hovering" above the variable), and as a result, the other variables 1616 connected to variable 1612 are visually emphasized, as well as the relationships 1614 corresponding to those connections. Similarly, identifying information 1618 about variable 1612, including a written description and a reference pattern icon are displayed near variable 1612. Relative to other elements 1620 in the causal loop diagram, the visually emphasized elements are more apparent, which enables users to easily view multiple elements within the diagram without changing to a deeper focus detail view and to quickly discern what elements affect a particular "hovered" element.

In one or more examples, the hover functionality can additionally or alternatively be used to visually emphasize other elements. As explained above, if a user hovers over an icon in the legend of the explorer mode, such as legend 1012 of FIG. 10, each element in the causal loop diagram of that type can be visually emphasized. If a user hovers over a relationship, the causal loop diagram may display a similar highlighted view as shown in FIG. 16B which shows the relationship name, the relationship type, the relationship direction, any variables the relationship connects, and/or identifying information about the relationship. Similarly, if a user hovers over a specific group, the causal loop diagram may show relevant variables, groups, and/or loops assigned to that group, relationships, as well as identifying information about those elements. If a user hovers over a loop, the causal loop diagram may display the elements within the loop, as well as identifying information about those elements and/or the loop.

In one or more examples, a causal loop diagram created using the causal loop designer 106 of FIG. 1 can be exported to other platforms in one or more formats. Causal loop diagrams can be exported, for example, as a static diagram, an animation or animated image, and/or an editable image file. A causal loop diagram can be exported in a format that can be opened using other existing software programs such as a presentation program, a word processing program, etc.

In one or more examples, underlying data corresponding to one or more variables, relationships, groups, and/or loops within a given causal loop diagram can be saved and/or exported to other platforms in one or more formats. The underlying data can be stored in database 104 of host server 102 of FIG. 1. The underlying data can, for example, be exported and used to facilitate the programming of a simulation model. The underlying data can pre-populate source code of a simulation model with variable names, relationships, groups, and/or loops corresponding to the elements of a causal loop diagram.

Figure 17:
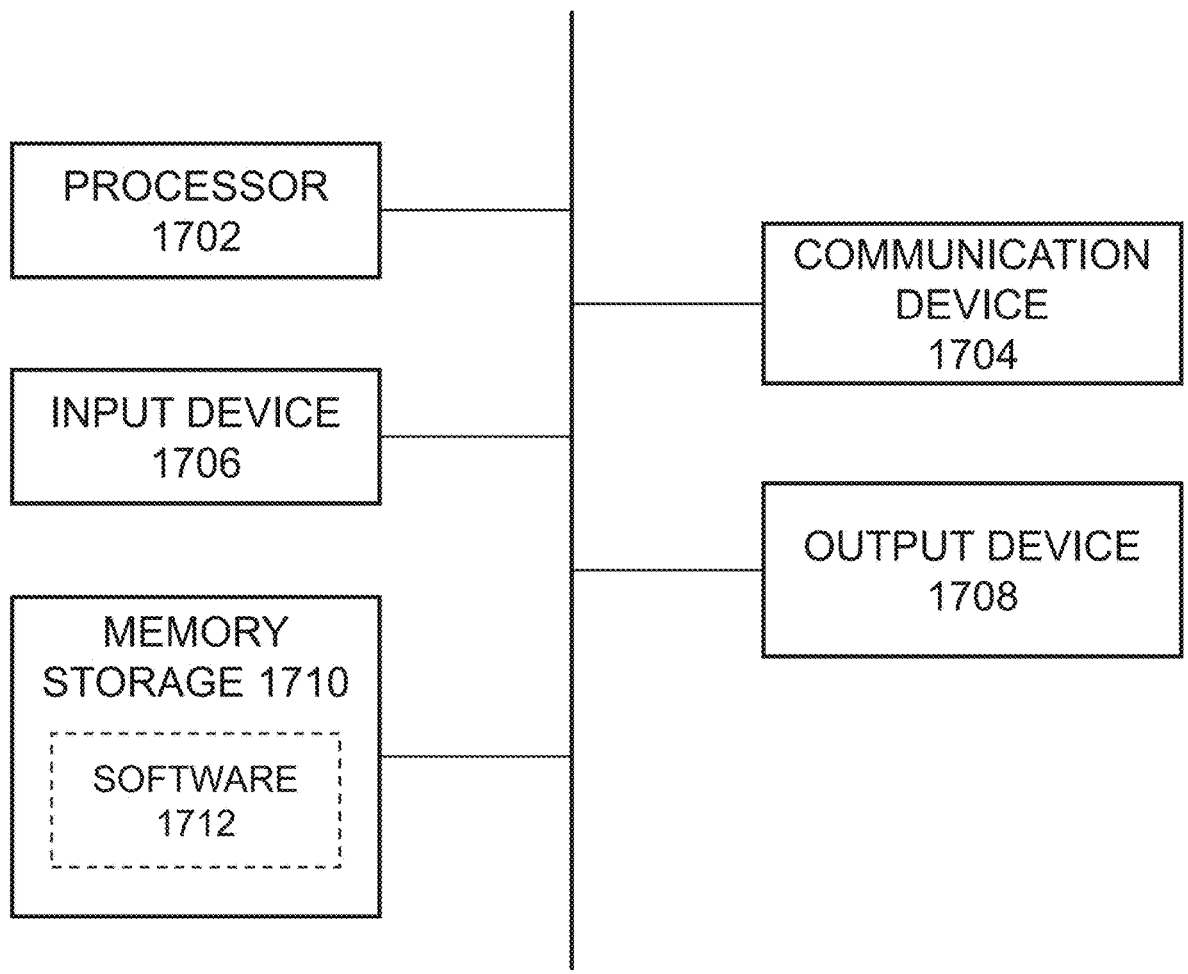
FIG. 17 depicts an exemplary computing device, in accordance with one or more examples.

FIG. 17 depicts an exemplary computing device 1700, in accordance with one or more examples. Device 1700 can be a host computer connected to a network. Device 1700 can be a client computer or a server. As shown in FIG. 17, device 1700 can be any suitable type of microprocessor-based device, such as a personal computer, workstation, server, or handheld computing device (portable electronic device) such as a phone or a tablet. The device can include, for example, one or more processors, 1702, an input device 1706, an output device 1708, a memory storage 1710, and a communication device 1704.

The input device 1706 and output device 1708 can generally correspond to those described above and can either be connectable or integrated with the computer. The input device 1706 can be any suitable device that provides input, such as a touch screen, keyboard or keypad, mouse, or voice-recognition device. The output device 1708 can be any suitable device that provides output, such as a touch screen, haptics device, or speaker.

The memory storage 1710 can be any suitable device that provides storage, such as an electrical, magnetic, or optical memory, including a RAM, cache, hard drive, or removable storage disk. The communication device 1704 can include any suitable device capable of transmitting and receiving signals over a network, such as a network interface chip or device. The components of the computer can be connected in any suitable manner, such as via a physical bus or wirelessly.

The software 1712, which can be stored in the memory storage 1710 and executed by the processor 1702, can include, for example, the programming that embodies the functionality of the present disclosure (e.g., as embodied in the devices as described above). The software 1712 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as the memory storage 1710, that can contain or store programming for use by or in connection with an instruction execution system, apparatus, or device.

The software 1712 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

The device 1700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

The device 1700 can implement any operating system suitable for operating on the network. The software 1712 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Additionally, although the causal loop designer has been described with respect to examples of business enterprises, the causal loop designer is not limited to application only within business-focused environments. The causal loop designer can be used to model any number of complex systems in an efficient and interactive manner. Such changes and modifications are to be understood as being included within the scope of the disclosure and examples as defined by the claims.

For the purpose of clarity and a concise description, features are described herein as part of the same or separate embodiments; however, it will be appreciated that the scope of the disclosure includes embodiments having combinations of all or some of the features described.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. A computer-implemented method for creating a causal loop diagram comprising visually emphasized elements, the method comprising:

displaying a user interface comprising one or more selectable spawn buttons, wherein the one or more selectable spawn buttons comprise a variable spawn button, a group spawn button, and a loop spawn button;

detecting a user selecting a variable spawn button, and displaying a variable element in response to the user selecting the variable spawn button;

detecting a user selecting a group spawn button, and displaying a group element in response to the user selecting the group spawn button;

detecting a user selecting a loop spawn button, and displaying a loop element in response to the user selecting the loop spawn button, wherein each of the variable element, the loop element, and the group element comprise visually emphasizable elements;

in response to a user selecting one or more of the selectable spawn buttons, displaying a first element and a second element on the user interface, wherein the first element and the second element comprise visually emphasizable elements;

in response to receiving a user command to connect the first element to the second element, displaying a connection between the first element and the second element, wherein the connection comprises a visually emphasizable element;

displaying a causal loop diagram comprising the first element, the second element, and the connection; and in response to a user activating a visual emphasis tool, visually emphasizing one or more of the visually emphasizable elements.

2. The computer-implemented method of claim 1, wherein the first element is a first variable element, the second element is a second variable element and the connection is a relationship, and wherein the first variable element, the second variable element and the relationship comprise visually emphasizable elements.

3. The computer-implemented method of claim 2, further comprising:
in response to the user selecting a loop spawn button, displaying a loop element on the user interface;
in response to receiving a user command to associate the first variable element and the second variable element with the loop element, creating an association between the first variable element, the second variable element, and the loop element;
displaying a causal loop diagram comprising the first element, the second element, the connection, and the loop element; and
in response to a user activating a visual emphasis tool with respect to the loop element, visually emphasizing each element of the association.

4. The computer-implemented method of claim 2, further comprising:
in response to the user selecting a group spawn button, displaying a group element on the user interface;
in response to receiving a user command to associate the first variable element and the second variable element with the group element, creating an association between the first variable element, the second variable element, and the group element;
displaying a causal loop diagram comprising the first element, the second element, the connection, and the group element; and
in response to a user activating a visual emphasis tool with respect to the loop element, visually emphasizing each element of the association.

5. The computer-implemented method of claim 1, comprising:
in response to a user selecting the first element, displaying an attribute menu about the first element;
in response to receiving one or more user commands to add one or more attributes about the first element, associating the one or more attributes with the first element; and
displaying a causal loop diagram comprising the first element, the second element, the connection, and the one or more attributes.

6. The computer-implemented method of claim 1, wherein the visual emphasis tool is a highlight tool.

7. The computer-implemented method of claim 6, wherein activating the highlight tool for a given visually emphasizable element occurs in response to a user placing a cursor over a particular visually emphasizable element.

8. The computer-implemented method of claim 7, wherein the displayed causal loop diagram comprises one or more emphasizable elements, and the method comprises:
in response to a user placing a cursor over a particular visually emphasizable element of the causal loop diagram displayed on the user interface, highlighting the particular visually emphasizable element.

9. The computer-implemented method of claim 7, wherein activating the highlight tool for the particular visually emphasizable element comprises highlighting the particular visually emphasizable element and one or more other visually emphasizable elements that are connected to the particular visually emphasizable element.

10. The computer-implemented method of claim 7, wherein the user interface comprises a legend comprising one or more element types corresponding to a type of element that can be displayed on the user interface, and the one or more element types comprise visually emphasizable elements; and the method comprises:
in response to a user placing the cursor over one of the one element types of the one or more element types in the legend, highlighting each element displayed on the user interface that is the same type of element as the element type.

11. The computer-implemented method of claim 1, comprising:
in response to the user selecting to enter a detail view of a particular element, displaying a transition animation before displaying a detail view user interface comprising the particular element and one or more relevant elements, the one or more relevant elements comprising one or more elements that are connected to the particular element and one or more connections that are connected to the particular element.

12. A system for enabling a first user to create a causal loop diagram comprising visually emphasized elements, the system comprising:
a memory;
one or more processors; and
one or more programs, wherein the one or more programs are stored in the memory and configured to be executed by the one or more processors, the one or more programs when executed by the one or more processors cause the processor to:
display a user interface comprising one or more selectable spawn buttons wherein the one or more selectable spawn buttons comprise a variable spawn button, a group spawn button, and a loop spawn button;
display a variable element if the user selects the variable spawn button, display a loop element if the user selects the loop spawn button, and display a group element if the user selects the group spawn button, wherein each of the variable element, the loop element, and the group element comprise visually emphasizable elements;
in response to a user selecting one or more of the selectable spawn buttons, display a first element and a second element on the user interface, wherein the first element and the second element comprise visually emphasizable elements;
in response to receiving a user command to connect the first element to the second element, display a connection between the first element and the second element, wherein the connection comprises a visually emphasizable element;
display a causal loop diagram comprising the first element, the second element, and the connection; and
in response to a user activating a visual emphasis tool, visually emphasize one or more of the visually emphasizable elements.

13. The system of claim 12, wherein the first element is a first variable element, the second element is a second variable element and the connection is a relationship, and wherein the first variable element, the second variable element and the relationship comprise visually emphasizable elements.

14. The system of claim 13, wherein the one or more programs when executed by the one or more processors cause the processor to:
  in response to the user selecting a loop spawn button, display a loop element on the user interface;
  in response to receiving a user command to associate the first variable element and the second variable element with the loop element, create an association between the first variable element, the second variable element, and the loop element;
  display a causal loop diagram comprising the first element, the second element, the connection, and the loop element; and
  in response to a user activating a visual emphasis tool with respect to the loop element, visually emphasize each element of the association.

15. The system of claim 13, wherein the one or more programs when executed by the one or more processors cause the processor to:
  in response to the user selecting a group spawn button, display a group element on the user interface;
  in response to receiving a user command to associate the first variable element and the second variable element with the group element, create an association between the first variable element, the second variable element, and the group element;
  display a causal loop diagram comprising the first element, the second element, the connection, and the group element; and
  in response to a user activating a visual emphasis tool with respect to the loop element, visually emphasize each element of the association.

16. The system of claim 12, wherein the one or more programs when executed by the one or more processors cause the processor to:
  in response to a user selecting the first element, display an attribute menu about the first element;
  in response to receiving one or more user commands to add one or more attributes about the first element, associate the one or more attributes with the first element; and
  display a causal loop diagram comprising the first element, the second element, the connection, and the one or more attributes.

17. The system of claim 12, wherein the visual emphasis tool is a highlight tool.

18. The system of claim 17, wherein activating the highlight tool for a particular visually emphasizable element occurs in response to a user placing a cursor over the particular visually emphasizable element.

19. The system of claim 18, wherein the displayed causal loop diagram comprises one or more emphasizable elements, and the one or more programs when executed by the one or more processors cause the processor to:
  in response to a user placing a cursor over a particular visually emphasizable element of the causal loop diagram displayed on the user interface, highlight the particular visually emphasizable element.

20. The system of claim 18, wherein activating the highlight tool for the particular visually emphasizable element comprises highlighting the particular visually emphasizable element and one or more other visually emphasizable elements that are connected to the particular visually emphasizable element.

21. The system of claim 18, wherein the user interface comprises a legend comprising one or more element types corresponding to a type of element that can be displayed on the user interface, and the one or more element types comprise visually emphasizable elements; and the one or more programs when executed by the one or more processors cause the processor to:
  in response to a user placing the cursor over one of the one element types of the one or more element types in the legend, highlight each element displayed on the user interface that is the same type of element as the element type.

22. The system of claim 12, wherein the one or more programs when executed by the one or more processors cause the processor to:
  in response to the user selecting to enter a detail view of a particular element, display a transition animation before displaying a detail view user interface comprising the particular element and one or more relevant elements, the one or more relevant elements comprising one or more elements that are connected to the particular element and one or more connections that are connected to the particular element.

23. A non-transitory computer-readable storage medium storing one or more programs for an interactive causal loop designer, the one or more programs comprising instructions which, when executed by an electronic device with a display and a user input interface, cause the device to:
  display a user interface comprising one or more selectable spawn buttons, wherein the one or more selectable spawn buttons comprise a variable spawn button, a group spawn button, and a loop spawn button;
  display a variable element if the user selects the variable spawn button, display a loop element if the user selects the loop spawn button, and display a group element if the user selects the group spawn button, wherein each of the variable element, the loop element, and the group element comprise visually emphasizable elements;
  in response to a user selecting one or more of the selectable spawn buttons, display a first element and a second element on the user interface, wherein the first element and the second element comprise visually emphasizable elements;
  in response to receiving a user command to connect the first element to the second element, display a connection between the first element and the second element, wherein the connection comprises a visually emphasizable element;
  display a causal loop diagram comprising the first element, the second element, and the connection; and
  in response to a user activating a visual emphasis tool, visually emphasize one or more of the visually emphasizable elements.

24. The computer-readable storage medium of claim 23, wherein the first element is a first variable element, the second element is a second variable element and the connection is a relationship, and wherein the first variable element, the second variable element and the relationship comprise visually emphasizable elements.

25. The computer-readable storage medium of claim 24, wherein the one or more programs comprise instructions that cause the device to:
  in response to the user selecting a loop spawn button, display a loop element on the user interface;
  in response to receiving a user command to associate the first variable element and the second variable element with the loop element, create an association between the first variable element, the second variable element, and the loop element;

display a causal loop diagram comprising the first element, the second element, the connection, and the loop element; and in response to a user activating a visual emphasis tool with respect to the loop element, visually emphasize each element of the association.

26. The computer-readable storage medium of claim 24, wherein the one or more programs comprise instructions that cause the device to:

in response to the user selecting a group spawn button, display a group element on the user interface;

in response to receiving a user command to associate the first variable element and the second variable element with the group element, create an association between the first variable element, the second variable element, and the group element;

display a causal loop diagram comprising the first element, the second element, the connection, and the group element; and in response to a user activating a visual emphasis tool with respect to the loop element, visually emphasize each element of the association.

27. The computer-readable storage medium of claim 23, wherein the one or more programs comprise instructions that cause the device to:

in response to a user selecting the first element, display an attribute menu about the first element;

in response to receiving one or more user commands to add one or more attributes about the first element, associate the one or more attributes with the first element; and display a causal loop diagram comprising the first element, the second element, the connection, and the one or more attributes.

28. The computer-readable storage medium of claim 23, wherein the visual emphasis tool is a highlight tool.

29. The computer-readable storage medium of claim 28, wherein activating the highlight tool for a particular visually emphasizable element occurs in response to a user placing a cursor over the particular visually emphasizable element.

30. The computer-readable storage medium of claim 29, wherein the displayed causal loop diagram comprises one or more emphasizable elements, and the one or more programs comprise instructions that cause the device to:

in response to a user placing a cursor over a particular visually emphasizable element of the causal loop diagram displayed on the user interface, highlight the particular visually emphasizable element.

31. The computer-readable storage medium of claim 29, wherein activating the highlight tool for the particular visually emphasizable element comprises highlighting the particular visually emphasizable element and one or more other visually emphasizable elements that are connected to the particular visually emphasizable element.

32. The computer-readable storage medium of claim 29, wherein the user interface comprises a legend comprising one or more element types corresponding to a type of element that can be displayed on the user interface, and the one or more element types comprise visually emphasizable elements; and the one or more programs comprise instructions that cause the device to:

in response to a user placing the cursor over one of the one element types of the one or more element types in the legend, highlight each element displayed on the user interface that is the same type of element as the element type.

33. The computer-readable storage medium of claim 23, wherein the one or more programs comprise instructions that cause the device to:

in response to the user selecting to enter a detail view of a particular element, display a transition animation before displaying a detail view user interface comprising the particular element and one or more relevant elements, the one or more relevant elements comprising one or more elements that are connected to the particular element and one or more connections that are connected to the particular element.

* * * * *